United States Patent
Root et al.

(10) Patent No.: US 12,142,152 B2
(45) Date of Patent: *Nov. 12, 2024

(54) SYSTEMS AND METHODS FOR TAIL-SPECIFIC PARAMETER COMPUTATION

(71) Applicant: THE BOEING COMPANY, Chicago, IL (US)

(72) Inventors: Robert Edwin Root, Kent, WA (US); Charles E. Kaul, Prescott, AZ (US); James Louis Tylee, Seattle, WA (US)

(73) Assignee: THE BOEING COMPANY, Arlington, VA (US)

( * ) Notice: Subject to any disclaimer, the term of this patent is extended or adjusted under 35 U.S.C. 154(b) by 263 days.

This patent is subject to a terminal disclaimer.

(21) Appl. No.: 17/484,867

(22) Filed: Sep. 24, 2021

(65) Prior Publication Data

US 2022/0013019 A1 Jan. 13, 2022

Related U.S. Application Data

(63) Continuation of application No. 16/284,477, filed on Feb. 25, 2019, now Pat. No. 11,158,197.

(51) Int. Cl.
*G08G 5/00* (2006.01)
*B64D 45/00* (2006.01)
*G07C 5/08* (2006.01)

(52) U.S. Cl.
CPC ........... *G08G 5/0039* (2013.01); *B64D 45/00* (2013.01); *G07C 5/0808* (2013.01); *G07C 5/0816* (2013.01)

(58) Field of Classification Search
CPC .... G08G 5/0039; B64D 45/00; G07C 5/0808; G07C 5/0816

(Continued)

(56) References Cited

U.S. PATENT DOCUMENTS

| 6,134,500 A | 10/2000 | Tang et al. |
| 2007/0032921 A1 | 2/2007 | Allen |

(Continued)

FOREIGN PATENT DOCUMENTS

| EP | 2631890 A3 | 12/2013 |
| EP | 3065020 A1 | 9/2016 |

(Continued)

OTHER PUBLICATIONS

Canadian Requisition by the Examiner for Application No. 3,067,151 dated Jan. 6, 2023, pp. 1-5.
Singapore Examination Report for application No. 10202001605Y dated Jan. 3, 2022, 6 pgs.
Communication pursuant to Article 94(3) EPC for application No. 20158048.7 dated Dec. 2, 2021, 8 pgs.

(Continued)

*Primary Examiner* — Hunter B Lonsberry
*Assistant Examiner* — Helen Li
(74) *Attorney, Agent, or Firm* — Moore IP Law

(57) ABSTRACT

A device for tail-specific parameter computation includes a memory, a network interface, and a processor. The memory is configured to store a tail-specific aircraft performance model for a first aircraft of an aircraft type. The tail-specific aircraft performance model is based on historical flight data of the first aircraft and a nominal aircraft performance model associated with a second aircraft of the aircraft type. The network interface is configured to receive flight data from a databus of the first aircraft. The processor is configured to generate, based at least in part on the flight data and the tail-specific aircraft performance model, a recommended cost index and a recommended cruise altitude. The processor is also configured to provide the recommended cost index and the recommended cruise altitude to a display device.

20 Claims, 8 Drawing Sheets

(58) Field of Classification Search
USPC .............................................................. 701/3
See application file for complete search history.

(56) References Cited

U.S. PATENT DOCUMENTS

| | | |
|---|---|---|
| 2014/0257598 A1 | 9/2014 | Bailey et al. |
| 2015/0279218 A1 | 10/2015 | Irrgang et al. |
| 2016/0019795 A1* | 1/2016 | Chircop ............... G08G 5/0078 |
| | | 701/3 |
| 2016/0343257 A1* | 11/2016 | Kim ..................... G08G 5/0013 |
| 2017/0284856 A1* | 10/2017 | Hagerott ................ G01G 19/07 |
| 2018/0286253 A1* | 10/2018 | Darnell ................ G08G 5/0039 |
| 2018/0340784 A1* | 11/2018 | Upadhyay ............... F01N 9/007 |
| 2018/0366011 A1 | 12/2018 | Blanchon et al. |
| 2019/0051189 A1* | 2/2019 | De Villele ......... G01C 21/3492 |

FOREIGN PATENT DOCUMENTS

| | | | |
|---|---|---|---|
| EP | 3211621 A1 | 8/2017 | |
| EP | 3378784 A1 | 9/2018 | |
| WO | WO-2015196259 A1 * | 12/2015 | ........... G06Q 10/047 |

OTHER PUBLICATIONS

Extended European Search Report for Application No. 20158048.7, dated Mar. 25, 2020, 7 pgs.
Singapore Search Report and Written Opinion for application No. 10202001605Y dated Mar. 17, 2021, 11 pgs.
Korean Office Action for application No. 1020200022235 dated Mar. 5, 2024, pp. 1-10.
Chinese Office Action for application No. 202010089457 dated Jun. 25, 2024, pp. 1-8.

* cited by examiner

SYSTEMS AND METHODS FOR TAIL-SPECIFIC PARAMETER COMPUTATION

CROSS-REFERENCE TO RELATED APPLICATIONS

The present application claims priority from and is a continuation of pending U.S. patent application Ser. No. 16/284,477 entitled "SYSTEMS AND METHODS FOR TAIL-SPECIFIC PARAMETER COMPUTATION," filed Feb. 25, 2019, the contents of which are incorporated herein by reference in their entirety.

FIELD OF THE DISCLOSURE

The present disclosure is generally related to systems and methods for determining tail-specific parameters.

BACKGROUND

Aircraft pilots typically have access to a cost index determined by an aircraft operator. The cost index is intended to reflect that aircraft operator's time and fuel-related costs associated with a flight. For example, a lower cost index typically corresponds to reduced fuel consumption, while a higher cost index corresponds to flying faster and increased fuel consumption. A pilot provides the cost index (e.g., a target cost index) to a flight management system of the aircraft. The flight management system recommends, based on a nominal aircraft performance model, a speed corresponding to the target cost index. The performance of an individual aircraft can differ from the nominal aircraft performance model for various reasons (e.g., manufacturing differences, changes over time, etc.) thereby causing an effective cost index of that aircraft (corresponding to the recommended speed) to differ from the target cost index. As a result, the aircraft operator is unable to achieve the desired balance between the time-related costs and the fuel-related costs.

SUMMARY

In a particular implementation, a device for tail-specific parameter computation includes a memory, a network interface, and a processor. The memory is configured to store a tail-specific aircraft performance model for a first aircraft of an aircraft type. The tail-specific aircraft performance model is based on historical flight data of the first aircraft and a nominal aircraft performance model associated with a second aircraft of the aircraft type. The network interface is configured to receive flight data from a databus of the first aircraft. The processor is configured to generate, based at least in part on the flight data and the tail-specific aircraft performance model, a recommended cost index and a recommended cruise altitude. The processor is also configured to provide the recommended cost index and the recommended cruise altitude to a display device.

In another particular implementation, a method for tail-specific parameter computation includes receiving, at a device, flight data from a databus of a first aircraft of an aircraft type. The method also includes generating, based at least in part on the flight data and a tail-specific aircraft performance model, a recommended cost index and a recommended cruise altitude. The tail-specific aircraft performance model is based on historical flight data of the first aircraft and a nominal aircraft performance model associated with a second aircraft of the aircraft type. The method further includes providing the recommended cost index and the recommended cruise altitude from the device to a display device of the first aircraft.

In another particular implementation, a computer-readable storage device stores instructions that, when executed by a processor, cause the processor to perform operations including receiving flight data from a databus of a first aircraft of an aircraft type. The operations also include generating, based at least in part on the flight data and a tail-specific aircraft performance model, a recommended cost index and a recommended cruise altitude. The tail-specific aircraft performance model is based on historical flight data of the first aircraft and a nominal aircraft performance model associated with a second aircraft of the aircraft type. The operations further include providing the recommended cost index and the recommended cruise altitude to a display device of the first aircraft.

The features, functions, and advantages described herein can be achieved independently in various implementations or may be combined in yet other implementations, further details of which can be found with reference to the following description and drawings.

DETAILED DESCRIPTION

Figure 1:
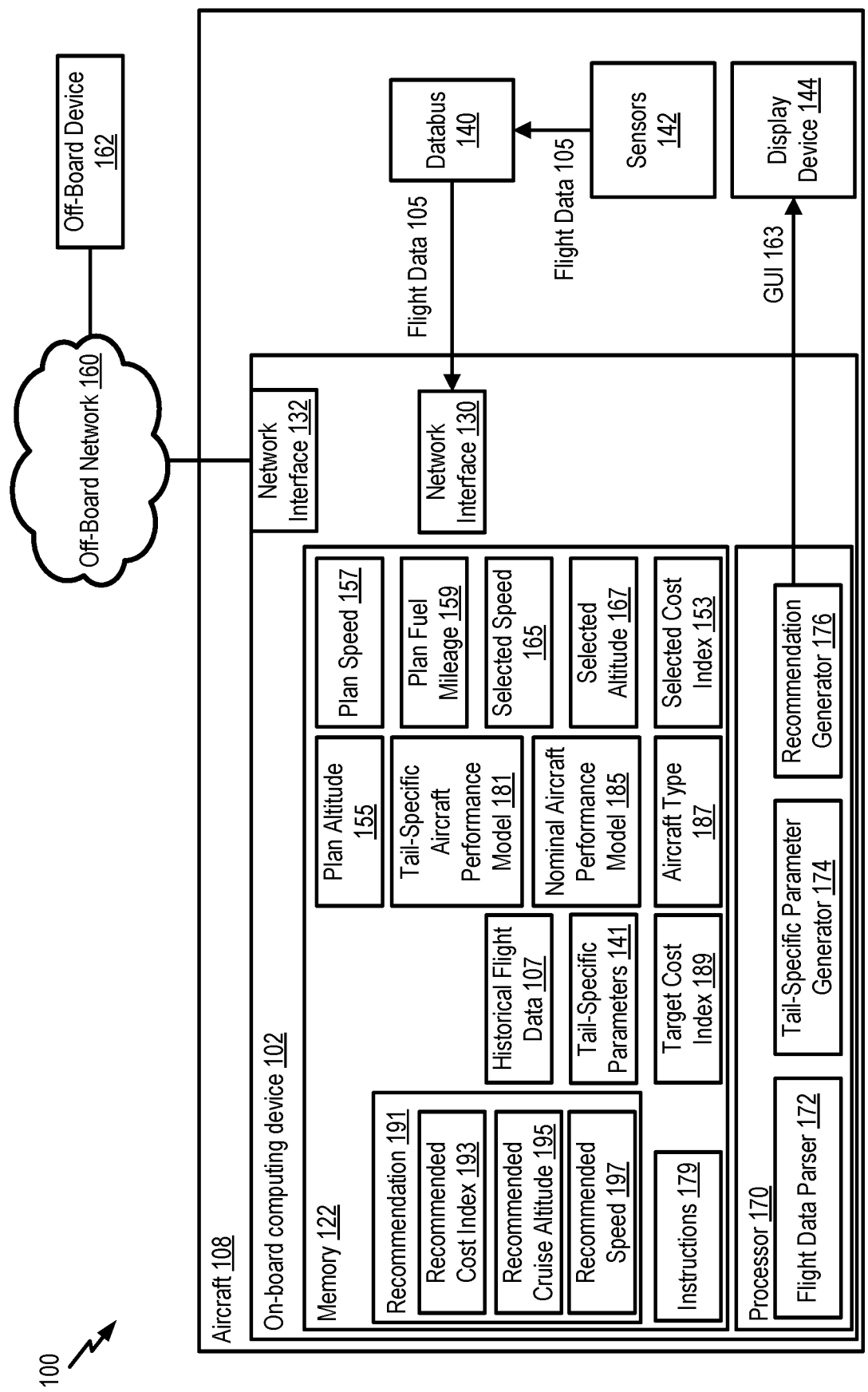
FIG. 1 is a block diagram that illustrates a system for tail-specific parameter computation.

Implementations described herein are directed to systems and methods for tail-specific parameter computation. A particular aircraft includes an on-board computing device that has access to a nominal aircraft performance model. The nominal aircraft performance model is associated with an aircraft type of the particular aircraft. For example, the nominal aircraft performance model is representative of a predicted average performance for aircrafts of the aircraft type. In some examples, the nominal aircraft performance model represents aircraft performance of a representative aircraft (e.g., a newly manufactured aircraft) of the aircraft type. To illustrate, the representative aircraft is assumed by the manufacturer to represent performance of all aircraft of the aircraft type. In practice, performance of individual aircraft can vary considerably from aircraft to aircraft.

A flight data parser has access to historical flight data of the particular aircraft. In some examples, the flight data parser is integrated into the particular aircraft. In alternative examples, an off-board device (e.g., a ground-based device) includes the flight data parser. The flight data parser updates the historical flight data by removing entries that correspond to outliers, sorting entries of the historical flight data, or a combination thereof.

A tail-specific parameter generator generates tail-specific parameters based on the historical flight data of the particular aircraft. As used herein, "tail-specific" refers to "specific to the particular aircraft." To illustrate, the tail-specific parameters are specific to (or related to) the particular aircraft. In some examples, the tail-specific parameter generator is integrated into the particular aircraft. In alternative examples, an off-board device (e.g., a ground-based device) includes the tail-specific parameter generator. The tail-specific parameter generator generates tail-specific parameters based on the historical flight data of the particular aircraft. The tail-specific parameters represent aircraft performance specific to the particular aircraft. The tail-specific parameter generator generates a tail-specific aircraft performance model by updating the nominal aircraft performance model based on the tail-specific parameters.

The on-board computing device includes a recommendation generator. The recommendation generator receives flight data from a databus of the particular aircraft and generates (e.g., in real-time) a recommended cost index based on the flight data and the tail-specific aircraft performance model. In some examples, the recommended cost index corresponds to an effective cost index of the particular aircraft that is the same as the target cost index. In some examples, the on-board computing device also determines a recommended cruise altitude, a recommended speed, or both. For example, the on-board computing device determines (based on the nominal aircraft performance model) the recommended cruise altitude, the recommended speed, or both, corresponding to the recommended cost index. In some examples, the recommended cost index, the recommended speed, the recommended cruise altitude, or a combination thereof, reduce (e.g., minimize) an operating cost of the particular aircraft. For example, the recommended cost index corresponds to an effective cost index of the aircraft that balances time-related costs and fuel-related costs such that the overall operating cost is reduced (e.g., minimized).

As used herein, various terminology is used for the purpose of describing particular implementations only and is not intended to be limiting. For example, the singular forms "a," "an," and "the" are intended to include the plural forms as well, unless the context clearly indicates otherwise. Further, the terms "comprise," "comprises," and "comprising" are used interchangeably with "include," "includes," or "including." Additionally, the term "wherein" is used interchangeably with the term "where." As used herein, "exemplary" indicates an example, an implementation, and/or an aspect, and should not be construed as limiting or as indicating a preference or a preferred implementation. As used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). As used herein, the term "set" refers to a grouping of one or more elements, and the term "plurality" refers to multiple elements.

Referring to FIG. 1, a system 100 for tail-specific parameter computation is shown. The system 100 includes an aircraft 108. The aircraft 108 includes an on-board computing device 102, a databus 140, one or more sensors 142, a display device 144, or a combination thereof. The on-board computing device 102 includes a processor 170, a memory 122, a network interface 130 (e.g., a first network interface), a network interface 132 (e.g., a second network interface), or a combination thereof. In a particular aspect, the on-board computing device 102 includes or corresponds to an aircraft integration device (AID), a flight management system, or both. In a particular aspect, the memory 122, the network interface 130, the processor 170, a recommendation generator 176, the on-board computing device 102, or a combination thereof, are integrated into a portable Electronic Flight Bag (EFB) computer. In a particular aspect an EFB computer includes a tablet, a mobile device, a communication device, a computing device, or a combination thereof.

It should be noted that in the following description, various functions performed by the system 100 of FIG. 1 are described as being performed by certain components or modules. However, this division of components and modules is for illustration only. In an alternate aspect, a function described herein as performed by a particular component or module is divided amongst multiple components or modules. Moreover, in an alternate aspect, two or more components or modules of FIG. 1 are integrated into a single component or module. In a particular aspect, one or more functions described herein as performed by the on-board computing device 102 are divided amongst multiple devices (e.g., the on-board computing device 102, an AID, a flight management system, a central server, a distributed system, or any combination thereof). Each component or module illustrated in FIG. 1 may be implemented using hardware (e.g., a field-programmable gate array (FPGA) device, an application-specific integrated circuit (ASIC), a digital signal processor (DSP), a controller, etc.), software (e.g., instructions executable by a processor), or any combination thereof.

The memory 122 includes volatile memory devices (e.g., random access memory (RAM) devices), nonvolatile memory devices (e.g., read-only memory (ROM) devices, programmable read-only memory, and flash memory), or both. In a particular aspect, the memory 122 includes one or more applications (e.g., instructions) executable by the processor 170 to initiate, control, or perform one or more operations described herein. In an illustrative example, a computer-readable storage device (e.g., the memory 122) includes instructions that, when executed by the processor 170, cause the processor 170 to initiate, perform, or control operations described herein. In a particular aspect, the memory 122 is configured to store instructions 179 that are executable by the processor 170 to perform one or more operations described herein.

In a particular aspect, the memory 122 is configured to store a nominal aircraft performance model 185. The nominal aircraft performance model 185 is associated with an aircraft type 187 of the aircraft 108. For example, the nominal aircraft performance model 185 is representative of a predicted average performance for aircrafts of the aircraft type 187. In a particular aspect, the nominal aircraft performance model 185 is generated by a manufacturer of the aircraft 108. The off-board device 162 (or another device) generates the nominal aircraft performance model 185 based on aircraft performance of a representative aircraft (e.g., a newly manufactured aircraft) of the aircraft type 187. In a particular aspect, the nominal aircraft performance model 185 is based on an estimated gross weight (e.g., an assumed gross weight) of the representative aircraft.

The sensors 142 are configured to provide flight data 105 to the databus 140. The flight data 105 indicates measurements performed by the sensors 142, as further described with reference to FIG. 5. The on-board computing device 102 is configured to receive the flight data 105 via the network interface 130 from the databus 140. In a particular aspect, the on-board computing device 102 (e.g., an aircraft integration device) obtains the flight data 105 as one or more of the sensors 142 provide the flight data 105 via the databus 140 to a digital flight data recorder. For example, the on-board computing device 102 obtains, at a first time, a first portion of the flight data 105 from a first sensor of the sensors 142. The on-board computing device 102 obtains, at a second time, a second portion of the flight data 105 from a second sensor of the sensors 142. To illustrate, the first sensor provides the first portion of the flight data 105 at first time intervals, in response to detecting a first event, or both. The second sensor provides the second portion of the flight data 105 at second time intervals, in response to detecting a second event, or both.

The network interface 132 is configured to communicate, via an off-board network 160, with an off-board device 162 (e.g., a ground-based device). The off-board network 160 includes a wired network, a wireless network, or both. The off-board network 160 includes one or more of a local area network (LAN), a wide area network (WAN), a cellular network, and a satellite network.

The processor 170 includes a flight data parser 172, a tail-specific parameter generator 174, the recommendation generator 176, or a combination thereof. The flight data parser 172 is configured to translate historical flight data 107 of the aircraft 108 into a format readable by the tail-specific parameter generator 174, remove outliers from the historical flight data 107, or both, as further described with reference to FIG. 3. The tail-specific parameter generator 174 is configured to generate tail-specific parameters 141 based on the historical flight data 107, as further described with reference to FIG. 4. For example, the tail-specific parameters 141 represent aircraft performance of the aircraft 108. In a particular aspect, the tail-specific parameter generator 174 generates a tail-specific aircraft performance model 181 based on the tail-specific parameters 141, as described with reference to FIG. 4. For example, the tail-specific parameter generator 174 generates the tail-specific aircraft performance model 181 by updating the nominal aircraft performance model 185 based on the tail-specific parameters 141.

In a particular aspect, the flight data parser 172, the tail-specific parameter generator 174, or both are integrated into the off-board device 162. In this aspect, the off-board device 162 includes a memory configured to store data used (or generated) by the flight data parser 172, the tail-specific parameter generator 174, or both. The on-board computing device 102 receives the tail-specific parameters 141, the tail-specific aircraft performance model 181, or both, via the off-board network 160, from the off-board device 162. The on-board computing device 102 stores the tail-specific parameters 141, the tail-specific aircraft performance model 181, or a combination thereof, in the memory 122.

The recommendation generator 176 is configured to generate a recommendation 191 based on a target cost index 189, the flight data 105, and the tail-specific aircraft performance model 181, as further described with reference to FIG. 5. For example, the recommendation 191 includes a recommended cost index 193. In a particular aspect, the recommendation generator 176 is configured to generate a recommended cruise altitude 195, a recommended speed 197, or a combination thereof, as further described with reference to FIG. 5. In a particular aspect, the recommendation generator 176 performs one or more operations described with reference to the flight data parser 172. For example, the recommendation generator 176 determines whether the flight data 105 corresponds to an outlier and generates the recommendation 191 in response to determining that the flight data 105 does not correspond to an outlier.

During a first stage of operation, the flight data parser 172 accesses the historical flight data 107 of the aircraft 108. For example, the first stage of operation corresponds to pre-flight preparation, post-flight updates, or both. In other examples, the first stage of operation occurs during a flight of the aircraft 108. In a particular aspect, a user (e.g., an information technology (IT) administrator) provides (subsequent to a first flight of the aircraft 108, prior to a second flight of the aircraft 108, or both) a user input indicating an aircraft identifier (ID) of the aircraft 108 to the flight data parser 172. The flight data parser 172 accesses the historical flight data 107 of the aircraft 108 in response to receiving the user input indicating the aircraft ID. In a particular aspect, a user provides a user input indicating an aircraft ID of the aircraft 108 to the flight data parser 172 if the historical flight data 107 does not indicate the aircraft ID. The flight data parser 172 updates the historical flight data 107, as further described with reference to FIGS. 2-3. For example, the flight data parser 172 applies a gravitational variation adjustment to gross weight values indicated by the historical flight data 107, as further described with reference to FIG. 2. As another example, the flight data parser 172 identifies entries of the historical flight data 107 that correspond to outliers and updates the historical flight data 107 by removing the identified entries, as further described with reference to FIG. 3.

The tail-specific parameter generator 174 determines the tail-specific parameters 141 based on the historical flight data 107, as further described with reference to FIG. 4. In a particular aspect, the tail-specific parameter generator 174 determines the tail-specific parameters 141 in response to receiving a user input from a user (e.g., an IT administrator), receiving the historical flight data 107 from the flight data parser 172, receiving an update to the historical flight data 107 from the flight data parser 172, receiving a notification from the flight data parser 172 indicating that the historical flight data 107 is updated, or a combination thereof.

In a particular aspect, the tail-specific parameter generator 174 generates (or updates) the tail-specific aircraft performance model 181 based on the tail-specific parameters 141, as described with reference to FIG. 4. For example, the tail-specific parameter generator 174 has access to the nominal aircraft performance model 185 associated with the aircraft type 187 of the aircraft 108. The tail-specific parameter generator 174 generates the tail-specific aircraft performance model 181 by updating the nominal aircraft performance model 185 based on the tail-specific parameters 141. The nominal aircraft performance model 185 represents aircraft performance corresponding to a representative aircraft of the aircraft type 187. The tail-specific aircraft performance model 181 represents aircraft performance of the aircraft 108.

In a particular aspect, the off-board device 162 includes the flight data parser 172, the tail-specific parameter generator 174, or both. The on-board computing device 102 receives the tail-specific parameters 141, the tail-specific aircraft performance model 181, or both, from the off-board device 162. For example, a user (e.g., a pilot) provides, prior to a flight, a user input to the on-board computing device 102 to request a flight plan from the off-board device 162. The off-board device 162, in response to receiving the request for the flight plan from the on-board computing device 102 and determining that the request indicates the aircraft ID of the aircraft 108, sends the flight plan, the tail-specific parameters 141, the tail-specific aircraft performance model 181, or a combination thereof, to the on-board computing device 102.

It should be understood that the on-board computing device 102 is provided as an illustrative example. In some examples, the on-board computing device 102 corresponds to a mobile device (e.g., a tablet, a communication device, a computing device, or a combination thereof) that can be on-board the aircraft 108 at various times and off-board the aircraft 108 at other times. In a particular aspect, the pilot uses the mobile device to send the request for the flight plan prior to boarding the aircraft 108.

The on-board computing device 102 receives the target cost index 189. The target cost index 189 corresponds to a configuration setting, a user input, default data, or a combination thereof. In a particular aspect, the on-board computing device 102 receives the target cost index 189 from the off-board device 162, from a user (e.g., an IT administrator or a pilot), or a combination thereof. For example, a pilot provides the target cost index 189 to the on-board computing device 102 prior to a flight. In a particular aspect, the on-board computing device 102 determines, based on the nominal aircraft performance model 185, a plan altitude 155 (e.g., a plan optimum altitude or flight level), a plan speed 157, a plan fuel mileage 159, or a combination thereof, corresponding to the target cost index 189.

During a second stage of operation, the sensors 142 provide the flight data 105 to the databus 140. For example, the second stage of operation occurs during a flight of the aircraft 108. In some examples, the second stage of operation occurs subsequent to a first flight of the aircraft 108, prior to a second flight of the aircraft 108, or both. The sensors 142 provide the flight data 105 to the databus 140 at a particular time interval, in response to detecting an event, in response to receiving a request from a component of the aircraft 108, or a combination thereof. In a particular aspect, the flight data 105 indicates measurements performed by the sensors 142 during the flight.

The recommendation generator 176 generates the recommendation 191 based on the flight data 105, the tail-specific parameters 141, the tail-specific aircraft performance model 181, the target cost index 189, or a combination thereof, as further described with reference to FIG. 5. In a particular aspect, the recommendation generator 176 generates the recommendation 191 in response to receiving a user input from a user (e.g., a pilot), detecting cruise flight at a particular altitude of the aircraft 108, receiving the flight data 105, detecting a change in the flight data 105, or a combination thereof. The recommendation 191 includes the recommended cost index 193. In some aspects, the recommendation generator 176 determines the recommended cruise altitude 195, the recommended speed 197, or a combination thereof, corresponding to the recommended cost index 193, as further described with reference to FIG. 5.

The recommendation generator 176 generates a GUI 163 indicating the recommendation 191. For example, the GUI 163 indicates the recommended cost index 193, the recommended cruise altitude 195, the recommended speed 197, or a combination thereof. The recommendation generator 176 provides the GUI 163 to the display device 144. In some aspects, the GUI 163 indicates the target cost index 189, the plan altitude 155, the plan speed 157, the plan fuel mileage 159, or a combination thereof. The flight data 105 indicates a detected speed, a detected altitude, a detected fuel mileage of the aircraft 108, or a combination thereof. In some aspects, the GUI 163 indicates the detected speed, the detected altitude, the detected fuel mileage, or a combination thereof.

In a particular aspect, the on-board computing device 102 receives a user input indicating a selected cost index 153, a selected speed 165, a selected altitude 167, or a combination thereof. For example, a pilot selects the selected cost index 153, the selected altitude 167, the selected speed 165, or a combination thereof. In a particular aspect, the selected cost index 153 is distinct from the target cost index 189, the recommended cost index 193, or both. In some examples, the on-board computing device 102 automatically (e.g., independently of user input) sets the selected cost index 153 to the recommended cost index 193, the selected speed 165 to the recommended speed 197, the selected altitude 167 to the recommended cruise altitude 195, or a combination thereof.

In a particular aspect, the on-board computing device 102 determines the selected speed 165 corresponding to the selected cost index 153. For example, the on-board computing device 102 has access to a speed calculator (e.g., an economy (Econ) cruise speed table) that maps the selected cost index 153 and a wind component along track derived from a gross weight, a pressure ratio, a temperature ratio, or a combination thereof to the selected speed 165. The flight data 105 indicates the ground speed, the true airspeed, the gross weight, the pressure ratio, the temperature ratio, or a combination thereof, as further described with reference to FIG. 5.

In a particular aspect, the GUI 163 indicates the selected speed 165, the selected altitude 167, the selected cost index 153, or a combination thereof. The on-board computing device 102 (or another component of the aircraft 108) generates one or more control commands to update an altitude of the aircraft 108 to the selected altitude 167, a speed of the aircraft 108 to the selected speed 165, or both.

During a third stage of operation, the flight data parser 172 adds the flight data 105 to the historical flight data 107 in response to determining that the flight data 105 satisfies a filter criterion. For example, the third stage of operation corresponds to post-flight maintenance. In some examples, the third stage of operation occurs during the flight of the aircraft 108. It should be understood that three stages of operation are provided as an illustrative example. In some aspects, the operations described herein are performed in fewer than three stages or more than three stages. In a particular implementation, the recommendation generator 176 provides the flight data 105 to the off-board device 162. For example, the recommendation generator 176 provides the flight data 105 to the off-board device 162 in response to determining that the on-board computing device 102 is within a communication range of the off-board device 162, determining that the aircraft 108 has a particular status (e.g., landed), receiving a user input indicating that the flight data 105 is to be provided to the off-board device 162, receiving a request from the off-board device 162, or a combination thereof. In this example, the flight data parser 172 of the off-board device 162 adds the flight data 105 to the historical flight data 107 in response to determining that the flight data 105 satisfies the filter criterion. The tail-specific parameter generator 174 uses the updated historical flight data 107 to generate (or update) the tail-specific aircraft performance model 181 for use in subsequent flights of the aircraft 108.

The system 100 thus enables computation of the tail-specific parameters 141 that are based on the historical flight data 107 of the aircraft 108. The tail-specific parameters 141 are used to determine the recommended cost index 193. In some examples, the recommended cost index 193 corresponds to an effective cost index of the aircraft 108 that achieves the target time/fuel cost defined by the target cost index 189. In some aspects, the recommended cost index 193, the recommended cruise altitude 195, the recommended speed 197, or a combination thereof, reduce (e.g., minimize) operational costs of the aircraft 108 during flight.

Figure 2:
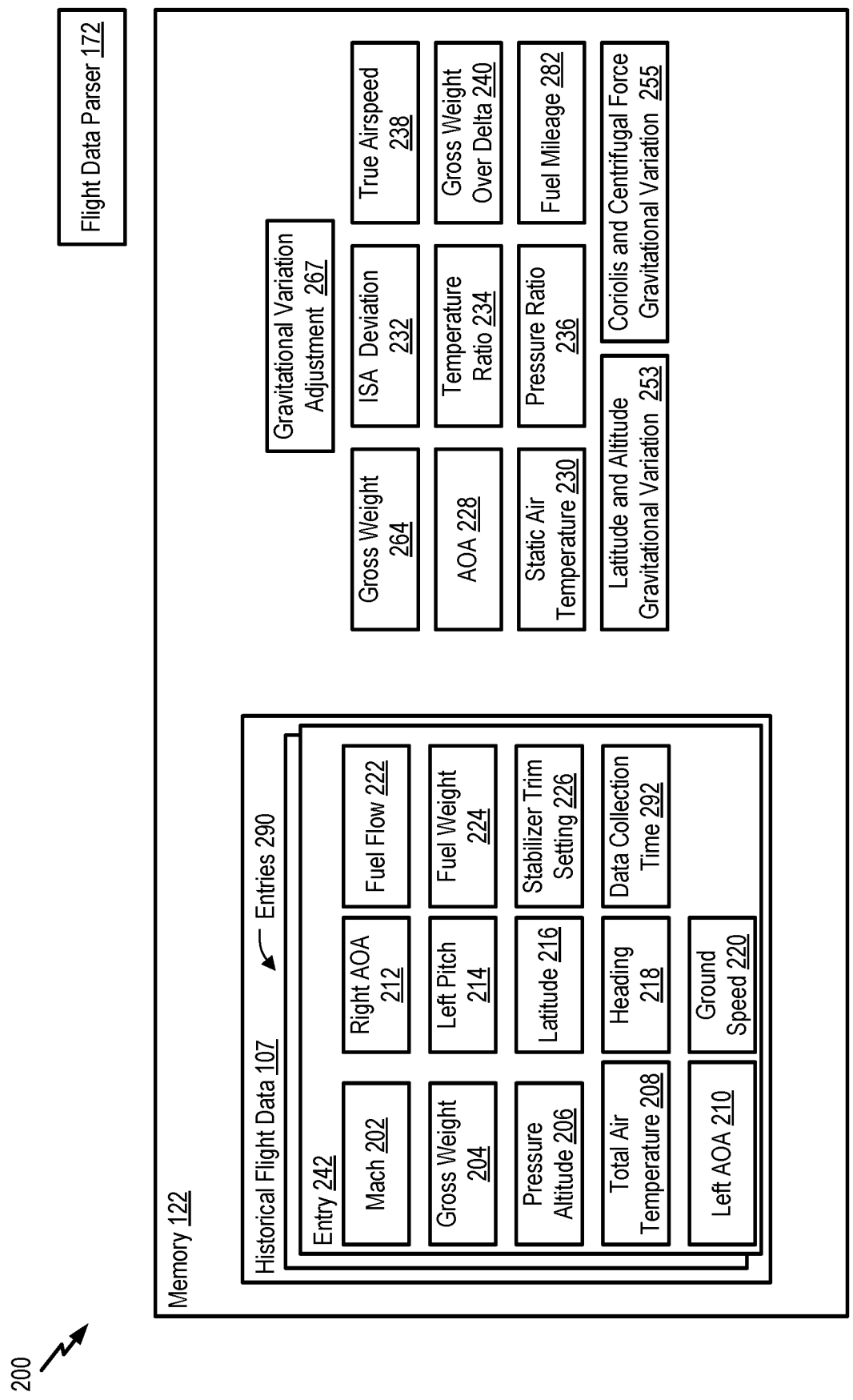
FIG. 2 is a diagram that illustrates aspects of a flight data parser and a memory of the system of FIG. 1.
Figure 3:
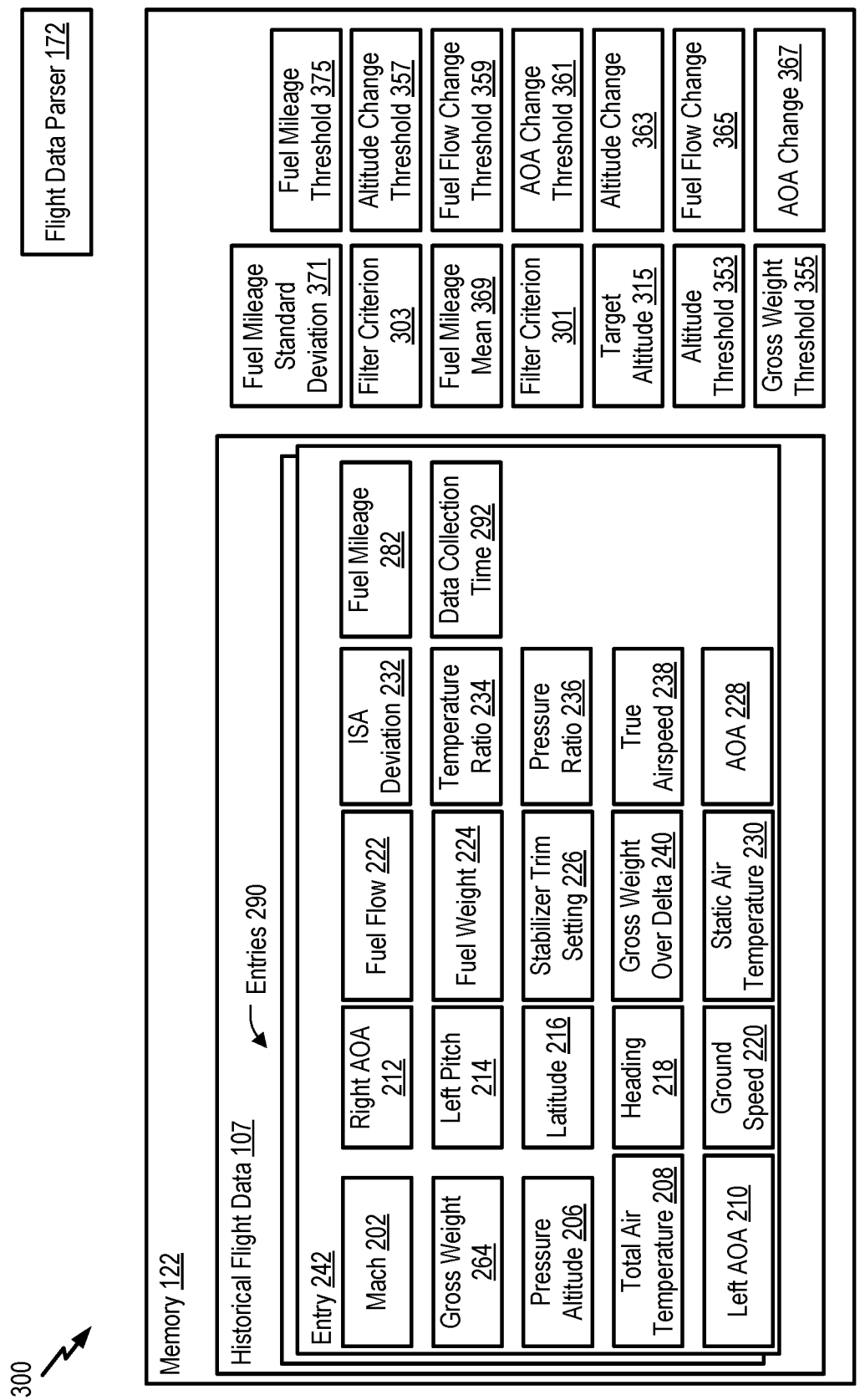
FIG. 3 is a diagram that illustrates additional aspects of the flight data parser and the memory of the system of FIG. 1.

FIGS. 2-3 illustrate aspects of the flight data parser 172 and the memory 122. FIG. 2 illustrates update of a gross weight based on a gravitational variation adjustment and determination of parameter values based on historical data. FIG. 3 illustrates filtration of the historical data based on a filter criterion.

Referring to FIG. 2, a diagram 200 illustrates aspects of the flight data parser 172 and the memory 122. The flight data parser 172 has access to the historical flight data 107 of the aircraft 108 of FIG. 1.

The historical flight data 107 includes a plurality of entries 290. Each of the entries 290 corresponds to a particular instance of the flight data 105 of FIG. 1. For example, the entries 290 include an entry 242 that corresponds to the flight data 105 received, during a particular flight, by the on-board computing device 102 at a first time from the databus 140, generated by the sensors 142 during a first time interval, or both. In a particular aspect, the entries 290 include a second entry that corresponds to the flight data 105 received by the on-board computing device 102 at a second time from the databus 140, generated by the sensors 142 during a second time interval, or both.

The entry 242 indicates speed information (e.g., a Mach number 202, a ground speed 220, or both), location information (e.g., a pressure altitude 206, a latitude 216, or both), attitude information (e.g., a left angle of attack (AOA) 210, a right AOA 212, pitch attitude (e.g., left pitch 214), a heading 218, or a combination thereof), ambient environment conditions (e.g., a total air temperature 208), weight information (e.g., a gross weight 204), fuel information (e.g., a fuel flow 222, a fuel weight 224, or both), settings (e.g., a stabilizer trim setting 226), or a combination thereof. In a particular aspect, the historical flight data 107 corresponds to a comma separated values (CSV) file and each line of the CSV file corresponds to an entry of the historical flight data 107.

In a particular aspect, the Mach number 202, the gross weight 204, the pressure altitude 206, the total air temperature 208, the left AOA 210, the right AOA 212, the left pitch 214, the latitude 216, the heading 218, the ground speed 220, the fuel flow 222, the fuel weight 224, the stabilizer trim setting 226, or a combination thereof, are detected by the sensors 142 during the particular flight of the aircraft 108. For example, the Mach number 202 corresponds to a detected Mach number of the aircraft 108 during the particular flight. The gross weight 204 corresponds to a reported gross weight of the aircraft 108 during the particular flight. The pressure altitude 206 corresponds to a detected pressure altitude of the aircraft 108 during the particular flight. The total air temperature 208 corresponds to a detected air temperature outside the aircraft 108 during the particular flight. The left AOA 210 corresponds to a detected left AOA of the aircraft 108 during the particular flight. The right AOA 212 corresponds to a detected right AOA of the aircraft 108 during the particular flight. The left pitch 214 corresponds to a detected left pitch of the aircraft 108 during the particular flight. The latitude 216 corresponds to detected latitude of the aircraft 108 during the particular flight. The heading 218 corresponds to a detected heading of the aircraft 108 during the particular flight. The ground speed 220 corresponds to a detected ground speed of the aircraft 108 during the particular flight. The fuel flow 222 corresponds to a detected fuel flow of the aircraft 108 during the particular flight. The fuel weight 224 corresponds to a detected fuel weight of the aircraft 108 during the particular flight. For example, the sensors 142 includes a fuel volume sensor that detects a volume of fuel of the aircraft 108 and determines the fuel weight 224 based on the volume of fuel. The stabilizer trim setting 226 corresponds to a detected stabilizer trim setting of the aircraft 108 during the particular flight.

In a particular aspect, each of the sensors 142 of FIG. 1 generates a time-series of values. For example, a first sensor of the sensors 142 generates a first time-series of values (e.g., Mach numbers) and a second sensor of the sensors 142 generates a second time-series of values (e.g., total air temperature measurements). In a particular aspect, the first sensor generates the first time-series of values (e.g., at two second intervals) asynchronously with the second time-series of values (e.g., at ten second intervals). For example, the first sensor generates a first Mach number at time t1 (e.g., 10:00:01), a second Mach number at time t2 (e.g., 10:00:03), a third Mach number at time t3 (e.g., 10:00:05), a fourth Mach number at time t4 (e.g., 10:00:07), a fifth Mach number at time t5 (e.g., 10:00:09), and so on. The second sensor generates a first total air temperature at time t11 (e.g., 10:00:02) and a second total air temperature at time t12 (e.g., 10:00:12).

In a particular aspect, the flight data parser 172 uses aggregation or binning to determine flight data values corresponding to a common time-series (e.g., at five second intervals). For example, the flight data parser 172 determines values for the entry 242 corresponding to the first time interval (e.g., 10:00:03-10:00:08). To illustrate, the flight data parser 172 determines a first value (e.g., the Mach number 202) based on the second Mach number for time t2 (e.g., 10:00:03), the third Mach number for time t3 (e.g., 10:00:05), the fourth Mach number for time t4 (e.g., 10:00:07), or a combination thereof. In a particular aspect, the first value (e.g., the Mach number 202) is based on an average of the second Mach number for time t2 (e.g., 10:00:03), the third Mach number for time t3 (e.g., 10:00:05), the fourth Mach number for time t4 (e.g., 10:00:07), or a combination thereof.

In a particular example, the flight data parser 172 determines a second value (e.g., the total air temperature 208) based on the first total air temperature for time t11 (e.g., 10:00:02), the second total air temperature at time t12 (e.g., 10:00:12), or both. For example, the flight data parser 172 designates the first total air temperature for time t11 as the second value (e.g., the total air temperature 208) in response to determining that the first total air temperature is the most recently received value from the second sensor prior to the first time interval (e.g., 10:00:03-10:00:08). As another example, the flight data parser 172 determines the second value (e.g., the total air temperature 208) based on an average of the first total air temperature for time t11 (e.g., 10:00:02) and the second total air temperature at time t12 (e.g., 10:00:12).

In a particular aspect, the entry 242 indicates a data collection time 292 corresponding to the first time interval. For example, the data collection time 292 includes a first timestamp corresponding to a beginning (e.g., 10:00:03) of the first time interval, a second timestamp corresponding to an end (e.g., 10:00:08) of the first time interval, a third timestamp corresponding to a middle (e.g., 10:00:05) of the first time interval, or a combination thereof.

In a particular aspect, the gross weight 204 is based on user input, a configuration setting, default data, or a combination thereof. For example, a pilot provides user input indicating the gross weight 204 (e.g., an initial gross weight) to the on-board computing device 102. The gross weight 204 (e.g., the initial gross weight) is based on a count of passengers, a count of checked baggage, or a combination thereof.

The flight data parser 172 determines one or more values based on the historical flight data 107. For example, the flight data parser 172 determines an AOA 228 (e.g., a detected angle of attack) based on the left AOA 210, the right AOA 212, the left pitch 214, or a combination thereof. In a particular aspect, the flight data parser 172 determines the AOA 228 based on the following Equation:

$$AOA = 5 + \frac{AOA_L + AOA_R + Pitch_L}{3} \qquad \text{Equation 1}$$

where AOA corresponds to AOA 228, $AOA_L$ corresponds to the left AOA 210, $AOA_R$ corresponds to the right AOA 212, and $Pitch_L$ corresponds to the left pitch 214. It should be understood that calculations based on the left pitch 214 are provided as illustrative examples. In other examples, the calculations are based on a right pitch of the aircraft 108 instead of the left pitch 214.

In a particular aspect, the flight data parser 172 determines a static air temperature 230 based on the Mach number 202 and the total air temperature 208. For example, the flight data parser 172 determines the static air temperature 230 based on the following Equation:

$$SAT = \frac{TAT + 273.15}{1 + 0.2M^2} - 273.15 \qquad \text{Equation 2}$$

where SAT corresponds to the static air temperature 230, TAT corresponds to the total air temperature 208, and M corresponds to the Mach number 202.

In a particular aspect, the flight data parser 172 determines an international standard atmosphere (ISA) deviation 232 based on the static air temperature 230 and the pressure altitude 206. For example, the flight data parser 172 determines the ISA deviation 232 based on the following Equation:

$$\Delta ISA = SAT - \left(15 - \frac{1.98 h_p}{1000}\right), h_p \leq 36089 \text{ ft} \qquad \text{Equation 3}$$

$$\Delta ISA = SAT - (-56.5), h_p > 36089 \text{ ft}$$

where $\Delta ISA$ corresponds to the ISA deviation 232, SAT corresponds to the static air temperature 230, and $h_p$ corresponds to the pressure altitude 206.

In a particular aspect, the flight data parser 172 determines a temperature ratio 234 based on the static air temperature 230. For example, the flight data parser 172 determines the temperature ratio 234 based on the following Equation:

$$\theta = \frac{SAT + 273.15}{288.15} \qquad \text{Equation 4}$$

where $\theta$ corresponds to the temperature ratio 234, and SAT corresponds to the static air temperature 230.

In a particular aspect, the flight data parser 172 determines a pressure ratio 236 based on the pressure altitude 206. For example, the flight data parser 172 determines the pressure ratio 236 based on the following Equation:

$$\delta = \left(\frac{288.15 - 0.0019812 h_p}{288.15}\right)^{5.25588}, h_p \leq 36089 \text{ ft} \qquad \text{Equation 5}$$

$$\delta = 0.22336 e^{\left(\frac{36089 - h_p}{20805.7}\right)}, h_p > 36089 \text{ ft}$$

where $\delta$ corresponds to the pressure ratio 236, $h_p$ corresponds to the pressure altitude 206, and e corresponds to Euler's number (2.718281828 . . . ).

In a particular aspect, the flight data parser 172 determines a true airspeed 238 (e.g., a detected airspeed) based on the temperature ratio 234 and the Mach number 202. For example, the flight data parser 172 determines the true airspeed 238 based on the following Equation:

$$VTAS = 661.475 M \theta^{0.5} \qquad \text{Equation 6}$$

where VTAS corresponds to the true airspeed 238, M corresponds to the Mach number 202, and $\theta$ corresponds to the temperature ratio 234.

In a particular aspect, the flight data parser 172 determines a gross weight over delta 240 based on the pressure ratio 236 and the gross weight 204. In a particular aspect, the gross weight over delta 240 is based on the pressure ratio 236 and a gross weight 264. The flight data parser 172 determines the gross weight 264 based on the gross weight 204, as described herein. In a particular aspect, the flight data parser 172 determines the gross weight over delta 240 based on the following Equation:

$$Wdel = \frac{GW}{(\delta \times 10^6)} \qquad \text{Equation 7}$$

where Wdel corresponds to the gross weight over delta 240 and $\theta$ corresponds to the pressure ratio 236. In a particular aspect, GW corresponds to the gross weight 204. In an alternative aspect, GW corresponds to the gross weight 264.

In a particular aspect, the flight data parser 172 determines a fuel mileage 282 based on the true airspeed 238 and the fuel flow 222. For example, the flight data parser 172 determines the fuel mileage 282 based on the following Equation:

$$FM = \frac{VTAS}{FF} \qquad \text{Equation 8}$$

where FM corresponds to the fuel mileage 282, VTAS corresponds to the true airspeed 238, and FF corresponds to the fuel flow 222.

In a particular aspect, the flight data parser 172 generates the gross weight 264 by adjusting the gross weight 204 based on a gravitational variation adjustment 267. The gravitational variation adjustment 267 includes adjustments for gravitational variation with latitude, altitude, Coriolis force, and centrifugal force. For example, the flight data parser 172 uses gravitational correction techniques to determine a latitude and altitude gravitational variation 253, a Coriolis and centrifugal force gravitational variation 255, or a combination thereof. The latitude and altitude gravitational variation 253 represents gravitational acceleration at the latitude 216 and at the pressure altitude 206. The Coriolis and centrifugal force gravitational variation 255 represents gravitational acceleration caused by the Coriolis force and the centrifugal force. The flight data parser 172 uses gravitational correction techniques to determine the gravitational variation adjustment 267 based at least in part on the latitude and altitude gravitational variation 253, the Coriolis and centrifugal force gravitational variation 255, or a combination thereof.

In a particular aspect, the flight data parser 172 determines the gross weight 264 based on the gross weight 204 and the gravitational variation adjustment 267 (e.g., the gross weight 264=the gross weight 204+the gravitational variation adjustment 267). The flight data parser 172 updates the entry 242 to indicate the gross weight 264. The gross weight 264 corresponds to the gross weight 204 adjusted (e.g., corrected) to account for gravitational variations (e.g., the gravitational variation adjustment 267).

Referring to FIG. 3, a diagram 300 illustrates aspects of the flight data parser 172 and the memory 122. The flight data parser 172 is configured to filter the historical flight data 107 based on a filter criterion 301, a filter criterion 303, or both. In a particular aspect, the filter criterion 301, the filter criterion 303, or both, correspond to user input, default data, a configuration setting, or a combination thereof. In a particular aspect, the flight data parser 172 is configured to convert the historical flight data 107 from a first format to a second format. For example, the first format is supported by the sensors 142 and the second format is supported by the tail-specific parameter generator 174.

In a particular aspect, the flight data parser 172 sorts the entries 290 based on a difference between the pressure altitude 206 and a target altitude 315 (e.g., abs (pressure altitude 206—target altitude 315). For example, the flight data parser 172 determines a first sorting value of the entry 242 based on an absolute value of a difference between the pressure altitude 206 and the target altitude 315. The flight data parser 172 determines a second sorting value of a second entry of the entries 290 based on an absolute value of a difference between a pressure altitude of the second entry and the target altitude 315. The flight data parser 172 sorts the entries 290 based on an ascending order or a descending order. For example, the flight data parser 172 sorts the entries 290 so that the entry 242 has a first sorted position in the entries 290 and the second entry has a second sorted position in the entries 290. In a particular aspect, the first sorted position is prior to the second sorted position in cases where the first sorting value is less than the second sorting value. In an alternative aspect, the first sorted position is subsequent to the second sorted position in cases where the first sorting value is less than the second sorting value.

In a particular aspect, the target altitude 315 (e.g., a target pressure altitude) corresponds to the selected altitude 167 of FIG. 1. In a particular aspect, the filter criterion 301, the filter criterion 303, the target altitude 315 (e.g., 31080 ft), an altitude threshold 353 (e.g., 24900 ft), a gross weight threshold 355 (e.g., 100000 pounds (lb)), an altitude change threshold 357 (e.g., 1 ft), a fuel flow change threshold 359 (e.g., 50 lb/hour (hr)), an AOA change threshold 361 (e.g., 0.05 degrees), or a combination thereof, correspond to user input, configuration data, default data, or a combination thereof.

The filter criterion 301 indicates overall threshold conditions (e.g., the altitude threshold 353, the gross weight threshold 355, or both), change threshold conditions (e.g., the altitude change threshold 357, the fuel flow change threshold 359, the AOA change threshold 361, or a combination thereof), or a combination thereof. For example, the flight data parser 172 determines whether the entry 242 satisfies the filter criterion 301 based on determining whether the entry 242 satisfy the overall threshold conditions, the change threshold conditions, or a combination thereof. To illustrate, the flight data parser 172 determines that the entry 242 fails to satisfy the filter criterion 301 in response to determining that the pressure altitude 206 fails to satisfy (e.g., is less than) the altitude threshold 353 (e.g., 24900 ft), that the gross weight 264 (e.g., a reported gross weight) fails to satisfy (e.g., is less than) the gross weight threshold 355 (e.g., 100000 pounds (lb)), or both. In a particular aspect, the flight data parser 172 uses the overall threshold conditions (e.g., the altitude threshold 353, the gross weight threshold 355, or both) to filter out entries that correspond to flight data collected when the aircraft 108 is experiencing flight conditions (e.g., too low, too light, ascending, descending, or a combination thereof) that are not considered representative of particular flight conditions (e.g., cruise) of the aircraft 108. In a particular aspect, the flight data parser 172 determines parameter value changes between entries of the entries 290. For example, the entry 242 of the entries 290 is a next entry subsequent to a first entry of the entries 290. The first entry corresponds to a first data collection time. The entry 242 corresponds to the data collection time 292. The entry 242 is the next entry subsequent to the first entry in a sorted version of the entries 290. In a particular implementation, the flight data parser 172 determines the parameter value changes based on a first sorted version of the entries 290 where the entries 290 are sorted based on the data collection time. For example, the entry 242 is the next entry subsequent to the first entry in the first sorted version of the entries 290 because the data collection time 292 is next and subsequent to the first data collection time. In a particular aspect, each of the first entry and the entry 242 correspond to flight data collected during a single flight of the aircraft 108.

In an alternative implementation, the flight data parser 172 determines the parameter value changes based on a second sorted version of the entries 290 where the entries 290 are sorted based on differences between the pressure altitude and the target altitude 315. For example, the entry 242 is the next entry subsequent to the first entry in the second sorted version of the entries 290 because a first sorting value (e.g., abs (pressure altitude 206–target altitude 315)) of the entry 242 is next and subsequent to a second sorting value of the first entry (e.g., abs (pressure altitude of the first entry–target altitude 315)). In a particular aspect, each of the first entry and the entry 242 correspond to flight data collected during a single flight of the aircraft 108. In an alternative aspect, the first entry corresponds to flight data collected during a first flight of the aircraft 108 and the entry 242 corresponds to flight data collected during a second flight of the aircraft 108. The first flight is prior to or subsequent to the second flight.

The flight data parser 172 filters out entries that correspond to large changes (e.g., a larger than threshold altitude change, a larger than threshold fuel flow change, a larger than threshold AOA change) between the adjacent entries of the sorted version of the entries 290. For example, the flight data parser 172 determines whether the entry 242 satisfies the change threshold conditions based on the parameter value changes. To illustrate, the flight data parser 172, in response to determining that the entry 242 is a next entry subsequent to the first entry of the entries 290 (e.g., the sorted version of the entries 290), determines an altitude change 363, a fuel flow change 365, an AOA change 367, or a combination thereof. The flight data parser 172 determines the altitude change 363 based on a difference between the pressure altitude 206 and a pressure altitude of the first entry. The flight data parser 172 determines the fuel flow change 365 based on a difference between the fuel flow 222 and a fuel flow of the first entry. The flight data parser 172 determines the AOA change 367 based on a difference between the AOA 228 and an AOA of the first entry.

In a particular aspect, the flight data parser 172 determines that the entry 242 fails to satisfy the filter criterion 301 in response to determining that the altitude change 363 fails to satisfy (e.g., is greater than) the altitude change threshold 357. In a particular aspect, the flight data parser 172 determines that the entry 242 fails to satisfy the filter criterion 301 in response to determining that the fuel flow change 365 fails to satisfy (e.g., is greater than) the fuel flow change threshold 359. In a particular aspect, the flight data parser 172 determines that the entry 242 fails to satisfy the filter criterion 301 in response to determining that the AOA change 367 fails to satisfy (e.g., is greater than) the AOA change threshold 361. In a particular aspect, the flight data parser 172 uses the change threshold conditions (e.g., the altitude change threshold 357, the fuel flow change threshold 359, the AOA change threshold 361, or a combination thereof) to filter out entries that correspond to flight data that indicates large changes (e.g., the altitude change 363, the fuel flow change 365, the AOA change 367) between adjacent entries.

The flight data parser 172 removes any of the entries 290 that fail to satisfy the filter criterion 301. For example, the flight data parser 172, in response to determining that the entry 242 fails to satisfy the filter criterion 301, removes the entry 242 from the entries 290. Alternatively, the flight data parser 172, in response to determining that the entry 242 satisfies the filter criterion 301, refrains from removing the entry 242 from the entries 290.

In some aspects, the flight data parser 172 determines whether the entries 290 satisfy the filter criterion 301 and refrains from determining whether the entries 290 satisfy the filter criterion 303. In an alternative aspect, the flight data parser 172 determines whether the entries 290 satisfy the filter criterion 303 in addition or as an alternative to satisfying the filter criterion 301. For example, the flight data parser 172 filters out entries that correspond to relatively large fuel mileage deviations (e.g., outside of a two standard deviation limit) among the entries 290 (e.g., the remaining entries that satisfy the filter criterion 301). To illustrate, the flight data parser 172 determines whether the entries 290 (e.g., the remaining entries that satisfy the filter criterion 301) satisfy relative fuel mileage conditions. The flight data parser 172, subsequent to removing any of the entries 290 that fail to satisfy the filter criterion 301, determines statistics for the remaining entries that satisfy the filter criterion 301. For example, the flight data parser 172 determines a fuel mileage mean 369 (e.g., an average fuel mileage) and a fuel mileage standard deviation 371 based on fuel mileage of the remaining entries that satisfy the filter criterion 301. To illustrate, the flight data parser 172, in response to determining that the entry 242 satisfies the filter criterion 301, determines the fuel mileage mean 369, the fuel mileage standard deviation 371, or both, based at least in part on the fuel mileage 282.

In a particular aspect, the flight data parser 172 determines whether the entries 290 (e.g., the remaining entries that satisfy the filter criterion 301) satisfy the filter criterion 303. For example, the flight data parser 172, in response to determining that the entry 242 satisfies the filter criterion 301, determines whether the entry 242 satisfies the filter criterion 303. To illustrate, the flight data parser 172 determines that the entry 242 fails to satisfy the filter criterion 303 in response to determining that the fuel mileage 282 fails to satisfy (e.g., is greater than) a fuel mileage threshold 375 (e.g., |the fuel mileage 282|>the fuel mileage threshold 375). The fuel mileage threshold 375 is based on the fuel mileage mean 369 and the fuel mileage standard deviation 371 (e.g., the fuel mileage threshold 375=the fuel mileage mean 369+2 (the fuel mileage standard deviation 371)). In a particular aspect, the flight data parser 172 determines that the entry 242 fails to satisfy the filter criterion 303 in response to determining that the fuel mileage 282 fails to satisfy a two standard deviation limit. In a particular aspect, the flight data parser 172 uses the filter criterion 303 (e.g., the fuel mileage threshold 375) to filter out entries that correspond to flight data that indicates relatively large fuel mileage (e.g., |the fuel mileage 282|>the fuel mileage threshold 375).

In a particular aspect, the flight data parser 172 removes any of the entries 290 that fail to satisfy the filter criterion 303. For example, the flight data parser 172, in response to determining that the entry 242 fails to satisfy the filter criterion 303, removes the entry 242 from the entries 290. Alternatively, the flight data parser 172, in response to determining that the entry 242 satisfies the filter criterion 303, refrains from removing the entry 242 from the entries 290.

The historical flight data 107 thus includes entries that satisfy a filter criterion (e.g., the filter criterion 301, the filter criterion 303, or both). For example, the flight data parser 172 removes any outliers from the entries 290 that fail to satisfy the overall threshold conditions, the change threshold conditions, the relative fuel mileage conditions, or a combination thereof. The entries 290 (e.g., the remaining entries that satisfy the filter criterion 301, the filter criterion 303, or both) correspond to data points that are representative of cruise performance of the aircraft 108 of FIG. 1.

Figure 4:
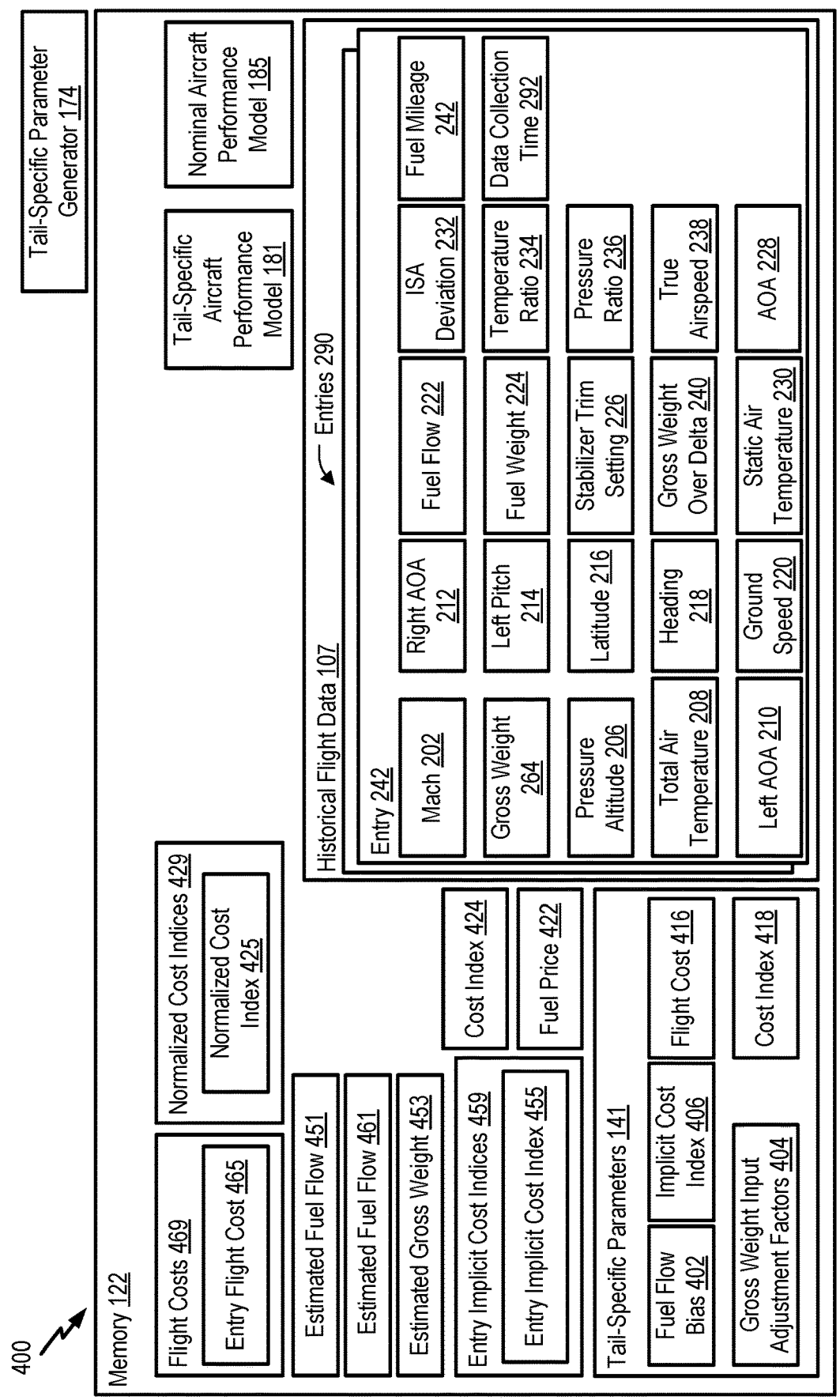
FIG. 4 is a diagram that illustrates aspects of a tail-specific parameter generator and the memory of the system of FIG. 1.

Referring to FIG. 4, a diagram 400 illustrates aspects of the tail-specific parameter generator 174 and the memory 122. The tail-specific parameter generator 174 has access to the nominal aircraft performance model 185 corresponding to the aircraft type 187 of the aircraft 108 of FIG. 1.

The tail-specific parameter generator 174 generates (or updates) the tail-specific aircraft performance model 181 based on the nominal aircraft performance model 185 and the historical flight data 107. In a particular example, the tail-specific parameter generator 174 determines a fuel flow bias 402 based on the historical flight data 107. To illustrate, the nominal aircraft performance model 185 indicates an estimated fuel flow 451 corresponding to the gross weight 264, the Mach number 202, the pressure altitude 206, the ISA deviation 232, or a combination thereof. The tail-specific parameter generator 174 determines the fuel flow bias 402 based on a comparison of the estimated fuel flow 451 and the fuel flow 222. In a particular aspect, the tail-specific parameter generator 174 determines a first set of values corresponding to the fuel flow 222 (e.g., detected fuel flow) for each of the entries 290 (e.g., entries that satisfy the filter criterion 301 and the filter criterion 303 of FIG. 3). The tail-specific parameter generator 174 determines a second set of values corresponding to the estimated fuel flow 451 for each of the entries 290.

The tail-specific parameter generator 174 determines the fuel flow bias 402 such that applying the fuel flow bias 402 to the second set of values improves a fit (e.g., reduces an error) between the second set of values and the first set of values. In a particular aspect, the tail-specific parameter generator 174 determines the fuel flow bias 402 to reduce a sum of squared error for the third set of values and the first set of values. For example, a squared error for the entry 242 is based on the following Equation:

$$e_i^2 = (FF_i - \beta_{fuel} FF_{INFLTi})^2 \qquad \text{Equation 9}$$

where i corresponds to the entry 242, $e_i^2$ corresponds to the squared error for the entry 242, $FF_i$ corresponds to the fuel flow 222, $\beta_{fuel}$ corresponds to the fuel flow bias 402, and $FF_{INFLTi}$ corresponds to the estimated fuel flow 451.

A sum of the squared error (E) of the entries 290 is based on the following Equation:

$$E = \Sigma_{i=1}^{N} e_i^2 = \Sigma_{i=1}^{N}(FF_i - \beta_{fuel} FF_{INFLTi})^2 \qquad \text{Equation 10}$$

where i corresponds to an ith entry (e.g., the entry 242), $e_i^2$ corresponds to the squared error for the ith entry (e.g., the entry 242), $FF_i$ corresponds to the fuel flow 222 for the ith entry (e.g., the entry 242), $\beta_{fuel}$ corresponds to the fuel flow bias 402, and $FF_{INFLTi}$ corresponds to the estimated fuel flow 451 for the ith entry (e.g., the entry 242).

A minimum value (e.g., 0) for the sum of the squared error (E) of the entries 290 is based on the following Equation:

$$\frac{dE}{d\beta_{fuel}} = 2\sum_{i=1}^{N}(FF_i - \beta_{fuel} FF_{INFLTi})(-FF_{INFLTi}) = 0 \qquad \text{Equation 11}$$

In this aspect, the tail-specific parameter generator 174 determines the fuel flow bias 402 based on the following Equation:

$$\beta_{fuel} = \frac{\Sigma_{i=1}^{N} FF_{INFLTi} FF_i}{\Sigma_{i=1}^{N} FF_{INFLTi}^2} \qquad \text{Equation 12}$$

It should be understood that determining the fuel flow bias 402 corresponding to a reduced (e.g., minimized) sum of squared error is provided as an illustrative example. In other implementations, the tail-specific parameter generator 174 uses other techniques of reducing a difference between the first set of values (e.g., detected fuel flow) and the third set of values (e.g., estimated fuel flow adjusted by the fuel flow bias 402). In a particular implementation, the tail-specific parameter generator 174 determines the fuel flow bias 402 that reduces an average difference between the first set of values (e.g., detected fuel flow) and the third set of values (e.g., estimated fuel flow adjusted by the fuel flow bias 402).

The tail-specific parameter generator 174 generates (or updates) the tail-specific aircraft performance model 181 by updating the nominal aircraft performance model 185 based on the fuel flow bias 402. For example, the nominal aircraft performance model 185 is configured to output the estimated fuel flow 451 corresponding to the gross weight 264, the Mach number 202, the pressure altitude 206, the ISA deviation 232, or a combination thereof. The tail-specific aircraft performance model 181 is configured to determine an estimated fuel flow 461 (associated with the entry 242) corresponding to the gross weight 264, the Mach number 202, the pressure altitude 206, the ISA deviation 232, or a combination thereof. The estimated fuel flow 461 is based on the estimated fuel flow 451 and the fuel flow bias 402 (e.g., estimated fuel flow 461=(fuel flow bias 402) (estimated fuel flow 451)).

In a particular aspect, the tail-specific aircraft performance model 181 indicates that an estimated gross weight corresponds to a plurality of input parameters. The plurality of input parameters includes (or is based on) values indicated in the historical flight data 107. For example, an estimated gross weight 453 (associated with the entry 242) is based on the plurality of input parameters including the fuel weight 224, the estimated fuel flow 451, the gross weight 264, the pressure ratio 236, the static air temperature 230, the ISA deviation 232, the AOA 228, the stabilizer trim setting 226, the Mach number 202, or a combination thereof. To illustrate, the plurality of input parameters includes a first input parameter (e.g., the fuel weight 224/a reference fuel weight), a second input parameter (e.g., the estimated fuel flow 451), a third input parameter (e.g., (the estimated fuel flow 451)$^2$), a fourth input parameter (e.g., a high gross weight indicator), a fifth input parameter (e.g., the pressure ratio 236), a sixth input parameter (e.g., a sum of the static air temperature 230 and the ISA deviation 232), a seventh input parameter (e.g., the AOA 228), an eighth input parameter (e.g., (the AOA 228)$^2$), a ninth input parameter (e.g., (the AOA 228)$^3$), a tenth input parameter (e.g., the stabilizer trim setting 226), an eleventh input parameter (e.g., (the stabilizer trim setting 226)$^2$), a twelfth input parameter (e.g., the Mach number 202), a thirteenth input parameter (e.g., (the Mach number 202)$^2$), one or more additional input parameters, or a combination thereof. In a particular aspect, the tail-specific parameter generator 174 determines that the high gross weight indicator has a first value (e.g., 1) in response to determining that the gross weight 264 fails to satisfy (e.g., is greater than) a gross weight threshold. Alternatively, the tail-specific parameter generator 174 determines that the high gross weight indicator has a second value (e.g., 0) in response to determining that the gross weight 264 satisfies (e.g., is less than or equal to) the gross weight threshold. In a particular aspect, the gross weight threshold, the reference fuel weight (e.g., 40000 lb), or both, correspond to a user input, a configuration setting, default data, or a combination thereof.

In a particular aspect, the estimated gross weight 453 corresponds to a weighted sum of the plurality of input parameters. For example, the estimated gross weight 453 is based on the following Equation:

$$GW_{esti} = \beta_0 + \beta_1 x_{1i} + \beta_2 x_{2i} + \ldots + \beta_m x_{mi} = \vec{x_i}' \vec{\beta} \qquad \text{Equation 13}$$

where $GW_{esti}$ corresponds to the estimated gross weight 453, $\beta_0$ corresponds to a constant intercept term, $x_i$ corresponds to an ith input parameter of the plurality of input parameters (e.g., $x_1, x_2, \ldots, x_m$), $\beta_i$ corresponds to a constant weight for the ith input parameter, and $\vec{\beta}$ (e.g., $\beta_0, \beta_1, \beta_2, \ldots \beta_m$) corresponds to gross weight input adjustment factors 404. The tail-specific parameter generator 174 is configured to determine the gross weight input adjustment factors 404, as described herein.

A difference between the gross weight 264 and the estimated gross weight 453 corresponds to residuals. For example, the residuals are based on the following Equation:

$$r_i = GW_i - GW_{esti} = GW_i - \vec{x_i}' \vec{\beta} \qquad \text{Equation 14}$$

In a particular aspect, the tail-specific parameter generator 174 uses iterative linear regression (e.g., a Huber approach) to determine the gross weight input adjustment factors 404. For example, the tail-specific parameter generator 174 determines the gross weight input adjustment factors 404 based on a weighted sum of the square of the residuals. In a particular aspect, the weighted sum of the square of the residuals is based on the following Equation:

$$\Sigma_{i=1}^{N} z_i (GW_i - \vec{x}_i^T \vec{\beta})^2 \qquad \text{Equation 15}$$

where $z_i$ corresponds to a weighting factor.

In a particular aspect, the tail-specific parameter generator 174 determines the gross weight input adjustment factors 404 based on reducing (e.g., minimizing) the weighted sum of the square of the residuals. For example, minimizing the weighted sum of the square of the residuals corresponds to setting the derivative of the weighted sum of the square of the residuals to zero. In a particular aspect, the tail-specific parameter generator 174 is configured to reduce (e.g., minimize) the weighted sum of the square of the residuals based on the following Equation:

$$\Sigma_{i=1}^{N} z_i (GW_i - \vec{x}_i^T \vec{\beta}) \vec{x}_i^T \vec{\beta} \qquad \text{Equation 15}$$

The tail-specific parameter generator 174 determines the weighting factor based on the residual values and a tuning parameter. For example, the tail-specific parameter generator 174 determines the weighting factor based on the following Equation:

$$z_i = \begin{cases} 1, & |r_i| \le k \\ \dfrac{k}{|r_i|}, & |r_i| > k \end{cases} \qquad \text{Equation 17}$$

where k corresponds to a tuning parameter. The tuning parameter is based on the following Equation:

$$k = 1.5\sigma \qquad \text{Equation 18}$$

where $\sigma$ corresponds to a standard deviation of estimation errors. The standard deviation of estimation errors is based on the following Equation:

$$\sigma \approx \frac{MAR}{0.6745} \qquad \text{Equation 19}$$

where MAR corresponds to a median absolute residual.

The weighting factor ($z_i$) depends on the residuals ($r_i$). The residuals ($r_i$) depend on the gross weight input adjustment factors 404 ($\vec{\beta}$). The gross weight input adjustment factors 404 ($\vec{\beta}$) depends on the weighting factor ($z_i$). The tail-specific parameter generator 174 uses an iterative approach to determining the gross weight input adjustment factors 404 ($\vec{\beta}$). In a particular aspect, the tail-specific parameter generator 174 determines the gross weight input adjustment factors 404 ($\vec{\beta}$) based on the following Equation:

$$\vec{\beta} = [\vec{X}^T \vec{Z} \vec{X}]^{-1} \vec{X}^T \vec{Z} (\vec{GW}) \qquad \text{Equation 20}$$

where $\vec{GW}$ is based on $(\vec{GW})^T = [GW_1\ GW_2 \ldots GW_N]$ and $GW_i$ corresponds to the gross weight 264 for an ith entry (e.g., the entry 242).

$\vec{X}$ is based on the following Equation:

$$\vec{X} = \begin{bmatrix} x_{11} & x_{21} & \cdots & x_{m1} \\ x_{12} & x_{22} & & x_{m2} \\ \vdots & & \ddots & \vdots \\ x_{1N} & x_{2N} & \cdots & x_{mN} \end{bmatrix} \qquad \text{Equation 21}$$

where $x_{ij}$ corresponds to a jth input parameter of the plurality of input parameters for the estimated gross weight 453 corresponding to the ith entry (e.g., the entry 242).

$\vec{Z}$ corresponds to diag $\{z_i\}$. For example, 2 corresponds to a matrix with values of $z_i$ in the main diagonal of the matrix.

The tail-specific parameter generator 174 determines a normalized gross weight vector ($\overline{\vec{GW}}$), where an ith element of the normalized gross weight vector ($\overline{GW}$) is based on the following Equation:

$$\overline{GW}_i = \frac{GW_i - \mu_{GW}}{\sigma_{GW}} \qquad \text{Equation 22}$$

where $\mu_{GW}$ corresponds to a mean of the estimated gross weight 453 corresponding to each of the entries 290 and $\sigma_{GW}$ corresponds to a standard deviation of the estimated gross weight 453 corresponding to each of the entries 290. The normalized gross weight vector ($\overline{GW}$) has a dimension of N.

The tail-specific parameter generator 174 determines a normalized input parameter matrix ($\overline{X}$), where $ji^{th}$ element of the normalized input parameter matrix ($\overline{X}$) is based on the following Equation:

$$\overline{x}_{ji} = \frac{x_{ji} - \mu_{x_j}}{\sigma_{x_j}} \qquad \text{Equation 23}$$

where $\mu_{x_j}$ corresponds to a mean of the jth column of $\vec{X}$ and $\sigma_{x_j}$ corresponds to a standard deviation of the jth column of $\vec{X}$. The normalized input parameter matrix ($\overline{X}$) has a dimension of N×m.

The normalized gross weight vector ($\overline{GW}$) is related to the normalized input parameter matrix ($\overline{X}$) based on the following Equation:

$$\overline{GW} = \overline{X} \overline{\beta} \qquad \text{Equation 24}$$

where $\overline{\beta}$ corresponds to an m element vector of normalized weights. In a particular aspect, $\overline{\beta}$ does not include an intercept term because all values have been normalized to zero mean. In a particular aspect, the vector of normalized weights ($\overline{\beta}$) is related to (but differs from) the vector of gross weight input adjustment factors 404 ($\vec{\beta}$), as described herein.

The tail-specific parameter generator 174 uses an iterative least squares approach to determine the vector of normalized weights ($\overline{\beta}$). For example, the tail-specific parameter generator 174 determines an initial estimate for the normalized weights vector $\overline{\beta}^{(0)}$ using a least squares estimate with all weighting factors in objective function equal to one. To illustrate, the tail-specific parameter generator 174 determines the initial estimate for the normalized weights vector $\overline{\beta}^{(0)}$ based on the following Equation:

$$\overline{\beta}^{(0)} = [\overline{X}^T \overline{X}]^{-1} \overline{X}^T (\overline{GW}) \qquad \text{Equation 25}$$

The tail-specific parameter generator 174 determines an initial residuals vector based on the initial estimate for the normalized weights vector $\overline{\beta}^{(0)}$. For example, the tail-specific parameter generator 174 determines the initial residuals vector based on the following Equation:

$$\vec{r} = \overline{(GW)} - \overline{X}\overline{\beta}^{(0)} \qquad \text{Equation 26}$$

The tail-specific parameter generator 174 determines a median absolute residual (MAR) based on the initial residuals vector. For example, the tail-specific parameter generator 174 determines the MAR based on the following Equation:

$$\text{MAR} = \text{median}(|\vec{r}_i - \text{median}(\vec{r})|) \qquad \text{Equation 27}$$

The tail-specific parameter generator 174, at each iteration t, determines residuals $\vec{r}^{(t-1)}$ and associated weights $z_i$. For example, the tail-specific parameter generator 174 determines the residuals $\vec{r}^{(t-1)}$ based on the following Equation:

$$\vec{r}^{(t-1)} = \overline{GW}_i - \overline{x}_i \overline{\beta}^{(t-1)} \qquad \text{Equation 28}$$

The tail-specific parameter generator 174 determines the associated weights $z_i$ based on the following Equation:

$$z_i = \begin{cases} 1, & |\vec{r}_i| \leq k \\ \frac{k}{|\vec{r}_i|}, & |\vec{r}_i| > k \end{cases} \qquad \text{Equation 29}$$

$$\text{where } k = 1.5\left(\frac{MAR}{0.6745}\right).$$

The tail-specific parameter generator 174 determines an estimate for a normalized beta vector $\overline{\beta}^{(t)}$ corresponding to the residuals $\vec{r}^{(t-1)}$ and associated weights $z_i$. For example, the tail-specific parameter generator 174 determines the estimate for the normalized beta vector $\overline{\beta}^{(t)}$ based on the following Equation:

$$\vec{\overline{\beta}}^{(t)} = [\vec{\overline{X}}^T \vec{Z}^{(t-1)} \vec{\overline{X}}]^{-1} \vec{\overline{X}}^T \vec{Z}^{(t-1)} \overline{(GW)} \qquad \text{Equation 30}$$

where the weight matrix $Z^{(t-1)}$ is based on the following Equation:

$$Z^{(t-1)} = {}_{diag}\{z_i^{(t-1)}\}^{-1} \qquad \text{Equation 31}$$

The tail-specific parameter generator 174 performs iterations until the estimated normalized beta vectors converge. The tail-specific parameter generator 174 determines, from $\overline{GW} = \overline{X}\overline{\beta}$, that a single normalized gross weight is related to a single normalized input parameter set according to the following Equation:

$$\frac{GW_i - \mu_{GW}}{\sigma_{GW}} = \sum_{j=1}^{m} \left(\frac{x_{ji} - \mu_{x_j}}{\sigma_{x_j}}\right)\overline{\beta}_j \qquad \text{Equation 32}$$

Solving for $GW_i$ yields the following Equation:

$$GW_i = \sigma_{GW} \sum_{j=1}^{m} \left(\frac{x_{ji} - \mu_{x_j}}{\sigma_{x_j}}\right)\overline{\beta}_j + \mu_{GW} \qquad \text{Equation 33}$$

Expanding the summation yields the following Equation:

$$GW_i = \sigma_{GW}\left(\frac{x_{1i} - \mu_{x_1}}{\sigma_{x_1}}\right)\overline{\beta}_1 + \qquad \text{Equation 34}$$
$$\sigma_{GW}\left(\frac{x_{2i}\mu_{x_2}}{\sigma_{x_2}}\right)\overline{\beta}_2 + \ldots + \sigma_{GW}\left(\frac{x_{mi}\mu_{x_m}}{\sigma_{x_m}}\right)\overline{\beta}_m + \mu_{GW}$$

Rearranging yields the following Equation:

$$GW_i = \frac{\sigma_{GW}}{\sigma_{x_1}}\overline{\beta}_1 x_{1i} + \frac{\sigma_{GW}}{\sigma_{x_2}}\overline{\beta}_2 x_{2i} + \ldots + \frac{\sigma_{GW}}{\sigma_{x_m}}\overline{\beta}_m x_{mi} + \qquad \text{Equation 35}$$
$$\mu_{GW} - \frac{\sigma_{GW}}{\sigma_{x_1}}\overline{\beta}_1 \mu_{x_1} - \frac{\sigma_{GW}}{\sigma_{x_2}}\overline{\beta}_2 \mu_{x_2} - \ldots - \frac{\sigma_{GW}}{\sigma_{x_m}}\overline{\beta}_m \mu_{x_m}$$

Comparing Equation 35 to Equation 13 (e.g., $GW_{esti} = \beta_0 + \beta_1 x_{1i} + \beta_2 x_{2i} + \ldots + \beta_m x_{mi} = \vec{x}_i^T \vec{\beta}$), the constant weights $\beta_j$ are related to the normalized weights $\overline{\beta}_j$ according to the following Equation:

$$\beta_j = \frac{\sigma_{GW}}{\sigma_{x_j}}\overline{\beta}_j, \; j = 1, 2, \ldots, m \qquad \text{Equation 36}$$

and the intercept corresponds to the following Equation:

$$\beta_0 = \mu_{GW} - \frac{\sigma_{GW}}{\sigma_{x_1}}\overline{\beta}_1 \mu_{x_1} - \frac{\sigma_{GW}}{\sigma_{x_2}}\overline{\beta}_2 \mu_{x_2} - \ldots - \frac{\sigma_{GW}}{\sigma_{x_m}}\overline{\beta}_m \mu_{x_m} \qquad \text{Equation 37}$$

Rewriting yields the following Equation:

$$\beta_0 = \mu_{GW} - \beta_1 \mu_{x_1} - \beta_2 \mu_{x_2} - \ldots - \beta_m \mu_{x_m} \qquad \text{Equation 38}$$

The tail-specific parameter generator 174 thus determines the gross weight input adjustment factors 404. In a particular aspect, the gross weight input adjustment factors 404 include a first adjustment factor (e.g., $\beta_1 = 1945.05850772936$), a second adjustment factor (e.g., $\beta_2 = 63.64717988524$), a third adjustment factor (e.g., $\beta_3 = 0.00283351843837169$), a fourth adjustment factor (e.g., $\beta_4 = 608.193281131959$), a fifth adjustment factor (e.g., $\beta_5 = -176687.200575113$), a sixth adjustment factor (e.g., $\beta_6 = -103.693898395283$), a seventh adjustment factor (e.g., $\beta_7 = 89247.9687202538$), an eighth adjustment factor (e.g., $\beta_8 = 12116.1469156739$), a ninth adjustment factor (e.g., $\beta_9 = 518.788789927141$), a tenth adjustment factor (e.g., $\beta_{10} = -22796.8715364357$), an eleventh adjustment factor (e.g., $\beta_{11} = 1874.40317603838$), a twelfth adjustment factor (e.g., $\beta_{12} = 711667.52591982$), a thirteenth adjustment factor (e.g., $\beta_{13} = -604891.665472913$), or a combination thereof. The gross weight input adjustment factors 404 also include an intercept term (e.g., $\beta_0 = -407864.296721922$).

The tail-specific parameter generator 174 generates (or updates) the tail-specific aircraft performance model 181 by updating the nominal aircraft performance model 185 based on the gross weight input adjustment factors 404. For example, the tail-specific aircraft performance model 181 indicates that an estimated gross weight corresponds to the plurality of input parameters and the gross weight input adjustment factors 404. To illustrate, the tail-specific aircraft performance model 181 is configured to determine that the estimated gross weight 453 (associated with the entry 242) is equal to a sum of the intercept term (e.g., $\beta_0$), a first weighted input parameter (e.g., the first adjustment factor*the fuel weight 224), a second weighted input parameter (e.g., the second adjustment factor*the estimated fuel flow 451), the third weighted input parameter (e.g., the third adjustment factor*(the estimated fuel flow 451)²), the fourth weighted input parameter (e.g., the fourth adjustment factor*a high gross weight indicator), the fifth weighted input parameter (e.g., the fifth adjustment factor*the pressure ratio 236), the sixth weighted input parameter (e.g., the sixth adjustment factor*(a sum of the static air temperature 230 and the ISA deviation 232)), the seventh weighted input parameter (e.g., the seventh adjustment factor*the AOA 228), the eighth weighted input parameter (e.g., the eighth adjustment factor*(the AOA 228)²), the ninth weighted input parameter (e.g., the ninth adjustment factor*(the AOA 228)³), the tenth weighted input parameter (e.g., the tenth adjustment factor*the stabilizer trim setting 226), the eleventh weighted input parameter (e.g., the eleventh adjustment factor*(the stabilizer trim setting 226)²), the twelfth weighted input parameter (e.g., the twelfth adjustment factor*the Mach number 202), the thirteenth weighted input parameter (e.g., the thirteenth adjustment factor*(the Mach number 202)²), or a combination thereof.

In a particular aspect, the tail-specific aircraft performance model 181 is configured to indicate an implicit cost index 406 associated with the aircraft 108. For example, the tail-specific parameter generator 174 determines entry implicit cost indices 459 corresponding to the entries 290 and determines the implicit cost index 406 based on the entry implicit cost indices 459. To illustrate, the tail-specific parameter generator 174 determines an entry implicit cost index 455 (corresponding to the entry 242) based on the Mach number 202, the ground speed 220, the true airspeed 238, a particular gross weight, the pressure ratio 236, the temperature ratio 234, or a combination thereof. In a particular aspect, the entry implicit cost index 455 indicates an estimated operating cost of the aircraft 108 during a flight corresponding to the entry 242. In a particular aspect, the particular gross weight corresponds to the gross weight 264. In an alternative aspect, the particular gross weight corresponds to the estimated gross weight 453. In a particular implementation, the tail-specific parameter generator 174 uses a cost index calculator (e.g., an Econ cruise speed table) that maps the Mach number 202, the ground speed 220, the true airspeed 238, a particular gross weight, the pressure ratio 236, the temperature ratio 234, or a combination thereof, to the entry implicit cost index 455. For example, the entry implicit cost index 455 is based on the following Equation:

$$CI_{deducedi} = f(M_i, VGS_i, VTAS_i, GW_i, \delta_i, \theta_i)\frac{lb}{100} / hr \quad \text{Equation 39}$$

where $CI_{deducedi}$ corresponds to the entry implicit cost index 455, $M_i$ corresponds to the Mach number 202, $VGS_i$ corresponds to the ground speed 220, $VTAS_i$ corresponds to the true airspeed 238, $GW_i$ corresponds to the gross weight 264 or the estimated gross weight 453, $\beta_i$ corresponds to the pressure ratio 236, $\theta_i$ corresponds to the temperature ratio 234, and f corresponds to a function (e.g., a mapping) of the cost index calculator (e.g., an Econ cruise speed table).

The tail-specific parameter generator 174 determines the implicit cost index 406 as an average (e.g., a mean) of the entry implicit cost indices 459. For example, the implicit cost index 406 is based on the following Equation:

$$CI_{deduced} = \frac{1}{N}\sum_{i=1}^{N} CI_{deducedi} \quad \text{Equation 40}$$

where $CI_{deduced}$ corresponds to the implicit cost index 406. In a particular aspect, the historical flight data 107 that is collected over multiple flights of the aircraft 108 of FIG. 1 and the implicit cost index 406 (e.g., 19.79031) is an average of the entry implicit cost indices 459 corresponding to the multiple flights of the aircraft 108.

In a particular aspect, the tail-specific aircraft performance model 181 is configured to indicate a flight cost 416 (e.g., a minimum operating cost), a cost index 418, or both. For example, the tail-specific parameter generator 174 determines flight costs 469 corresponding to the entries 290. To illustrate, the tail-specific parameter generator 174 determines an entry flight cost 465 corresponding to the entry 242 based on the following Equation:

$$C_{nm} = CF0(100CI + FF)/VGS\$/nm \quad \text{Equation 41}$$

where $C_{nm}$ corresponds to the entry flight cost 465, CF0 corresponds to a fuel price 422, CI corresponds to a cost index 424, FF corresponds to the fuel flow 222, and VGS corresponds to the ground speed 220. In a particular aspect, the entry flight cost 465 is in terms of dollars ($) per nautical mile (nm). In a particular aspect, the fuel price 422 (e.g., an assumed fuel price) corresponds to user input, a configuration setting, default data, or a combination thereof. In a particular aspect, the cost index 424 corresponds to the target cost index 189 of FIG. 1, an average cost index associated with an operator (e.g., an airline) of the aircraft 108, or both. The entry flight cost 465 indicates a time-related cost and a fuel-related cost associated with the entry 242.

The tail-specific parameter generator 174 determines normalized cost indices 429 corresponding to the entries 290. For example, the tail-specific parameter generator 174 determines a normalized cost index 425 corresponding to the entry 242 based on the following Equation:

$$Q_1 = \frac{CI_{deduced}}{\left(\frac{GW}{10^6 \delta}\right)} \quad \text{Equation 42}$$

where $Q_1$ corresponds to the normalized cost index 425, $CI_{deduced}$ corresponds to the implicit cost index 406, GW corresponds to a particular gross weight, and $\delta$ corresponds to the pressure ratio 236. In a particular aspect, the particular gross weight includes the gross weight 264. In an alternative aspect, the particular gross weight includes the estimated gross weight 453.

The tail-specific parameter generator 174 uses a curve-fitting technique to fit the flight costs 469 to the normalized cost indices 429. For example, the tail-specific parameter generator 174 uses an exponential model to perform the curve-fitting. The tail-specific parameter generator 174 determines model parameters based on the curve-fitting. For example, the tail-specific parameter generator 174 determines a first model parameter ($c_1$), a second model parameter ($c_2$), a third model parameter ($\lambda_1$), a fourth model parameter ($\lambda_2$), or a combination thereof. To illustrate, the tail-specific parameter generator 174 uses nonlinear optimization technique (e.g., the Nelder-Mead algorithm) to determine the exponents of a non-linear component (e.g., the third model parameter ($\lambda_1$), the fourth model parameter ($\lambda_2$), or both) and uses linear regression to determine coefficients (e.g., the first model parameter ($c_1$), the second model parameter ($c_2$), or both). In a particular aspect, the third model parameter ($\lambda_1$), the fourth model parameter ($\lambda_2$), or both, have negative values. A cost model corresponding to the model parameters is based on the following Equation:

$$\widehat{C_{nm}} = c_1 e^{-\lambda_1 Q_1} + c_2 e^{-\lambda_2 Q_1} \quad \text{Equation 43}$$

where $\widehat{C_{nm}}$ corresponds to the cost model.

The tail-specific parameter generator 174 determines the flight cost 416 (e.g., a minimum operating cost) based on the cost model. For example, the flight cost 416 corresponds to a lowest value of the normalized cost index 425 ($Q_1$) corresponding to the cost model. To illustrate, setting a derivative of the cost model to zero and solving for $Q_1$ yields the flight cost 416. The flight cost 416 corresponds to an estimated minimum operating cost of the aircraft 108. In a particular aspect, the particular gross weight factor is removed in solving for $Q_1$. In a particular example, the flight cost 416 is based on the following Equation:

$$Q_{1C_{min}} = \frac{\ln\left(-\frac{c_1 \lambda_1}{c_2 \lambda_2}\right)}{10^6 (\lambda_1 - \lambda_2)} \quad \text{Equation 44}$$

The tail-specific parameter generator 174 determines the cost index 418 for a particular entry based on the flight cost 416. For example, the tail-specific parameter generator 174 determines the cost index 418 that corresponds to the entry 242 at the flight cost 416 (e.g., a minimum flight cost). To illustrate, the cost index 418 indicates a predicted cost index that would have resulted if the entry 242 were related to a flight that operated at the flight cost 416 (e.g., the estimated minimum operating cost). The tail-specific parameter generator 174 determines the cost index 418 for a particular entry (e.g., a particular cruise flight condition) based on the following Equation:

$$CI_{C_{min}} = Q_{1C_{min}} * \left(\frac{GW}{\delta}\right) \quad \text{Equation 45}$$

where $CI_{C_{min}}$ corresponds to the cost index 418 for a particular entry, $Q_{1C_{min}}$ corresponds to the flight cost 416, GW corresponds to a particular gross weight for the particular entry, $\delta$ corresponds to the pressure ratio 236 for the particular entry. In a particular aspect, the particular gross weight corresponds to the gross weight 264. In an alternative aspect, the particular gross weight corresponds to the estimated gross weight 453.

Figure 5:
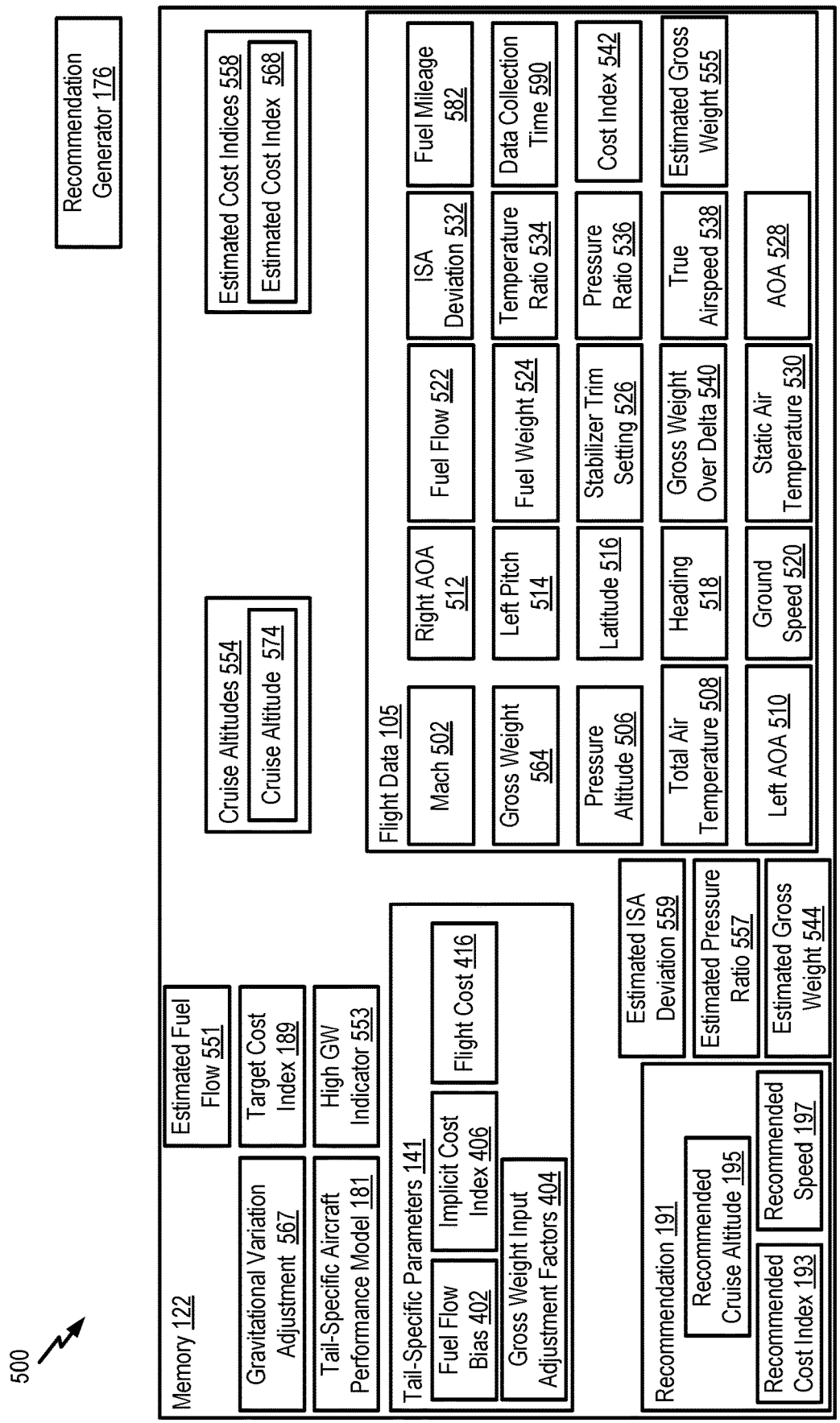
FIG. 5 is a diagram that illustrates aspects of a recommendation generator and the memory of the system of FIG. 1.

Referring to FIG. 5, a diagram 500 illustrates aspects of the recommendation generator 176 and the memory 122. The recommendation generator 176 has access to the tail-specific parameters 141, the tail-specific aircraft performance model 181, or a combination thereof. For example, the recommendation generator 176 receives the tail-specific parameters 141, the tail-specific aircraft performance model 181, or both, from the tail-specific parameter generator 174.

The recommendation generator 176 has access (e.g., in real-time) to the flight data 105 generated by the sensors 142 during a flight. The flight data 105 indicates a plurality of parameters. For example, the flight data 105 indicates speed information (e.g., a Mach number 502, a ground speed 520, or both), location information (e.g., a pressure altitude 506, a latitude 516, or both), attitude information (e.g., a left AOA 510, a right AOA 512, pitch (e.g., left pitch 514), a heading 518, or a combination thereof), ambient environment conditions (e.g., a total air temperature 508), weight information (e.g., a gross weight 564), fuel information (e.g., a fuel flow 522, a fuel weight 524, or both), settings (e.g., a stabilizer trim setting 526), or a combination thereof. In a particular aspect, the recommendation generator 176 determines (by performing similar calculations as the flight data parser 172 as described with reference to of FIG. 2) a gross weight over delta 540, a static air temperature 530, an ISA deviation 532, a temperature ratio 534, a pressure ratio 536, a true airspeed 538, an AOA 528, a fuel mileage 582, a data collection time 590, or a combination thereof, based on the flight data 105.

In a particular aspect, the gross weight 564 corresponds to a gross weight indicated in the flight data 105 as received from the sensors 142. In an alternative aspect, the flight data 105 received from the instruments indicates a first gross weight and the recommendation generator 176 determines the gross weight 564 based on the first gross weight and a gravitational variation adjustment 567 (e.g., the gross weight 564=the first gross weight+the gravitational variation adjustment 567). In a particular aspect, the recommendation generator 176 determines the gravitational variation adjustment 567 by performing similar calculations as performed by the flight data parser 172 to determine the gravitational variation adjustment 267, as described with reference to FIG. 2. In an alternative aspect, the tail-specific aircraft performance model 181 indicates the gravitational variation adjustment 267 and the recommendation generator 176 determines the gravitational variation adjustment 567 based on the gravitational variation adjustment 267. In a particular example, the gravitational variation adjustment 567 is the same as the gravitational variation adjustment 267.

In a particular aspect, the recommendation generator 176 determines whether the flight data 105 satisfies the filter criterion 301, the filter criterion 303, or both. For example, the recommendation generator 176 performs similar calculations as performed by the flight data parser 172, as described with reference to FIG. 3. The recommendation generator 176, in response to determining that the flight data 105 satisfies the filter criterion 301, the filter criterion 303, or both, generates the recommendation 191 based on the flight data 105. Alternatively, the recommendation generator 176, in response to determining that the flight data 105 fails to satisfy the filter criterion 301, the filter criterion 303, or both, refrains from generating the recommendation 191 based on the flight data 105.

The recommendation generator 176 is configured to determine the recommended cost index 193 based on the tail-specific aircraft performance model 181. For example, the recommendation generator 176, in response to determining that the tail-specific aircraft performance model 181 indicates the flight cost 416, determines the recommended cost index 193 based on the flight cost 416. To illustrate, the recommendation generator 176 determines recommended cost index 193 based on Equation 45, where $CI_{C_{min}}$ corresponds to the recommended cost index 193, $Q_{1C_{min}}$ corresponds to the flight cost 416, GW corresponds to the gross weight 564, and $\delta$ corresponds to the pressure ratio 536.

In a particular aspect, the recommendation generator 176 is configured to use altitude calculation techniques (e.g., an optimal performance altitude calculation technique) to determine the recommended cruise altitude 195. For example, the recommendation generator 176 determines the recommended cruise altitude 195 based on an estimated gross weight 544, the total air temperature 508, a cost index 542, a center of gravity, an allowance for buffet boundary limitations, estimated wind speeds, or a combination thereof. To illustrate, the recommendation generator 176 determines the cost index 542 based on Equation 45, where $CI_{C_{min}}$ corresponds to the cost index 542, $Q_{1C_{min}}$ corresponds to the flight cost 416, GW corresponds to the estimated gross weight 555, and δ corresponds to the pressure ratio 536.

The recommendation generator 176 determines the estimated gross weight 555 based on the gross weight input adjustment factors 404 and the plurality of parameters. To illustrate, the recommendation generator 176 determines the estimated gross weight 555 based on the following Equation:

$$GW_{est} = \beta_0 + \beta_1 x_1 + \beta_2 x_2 + \ldots + \beta_m x_m \quad \text{Equation 46}$$

where $GW_{est}$ corresponds to the estimated gross weight 555. $\beta_0$ corresponds to the intercept term indicated by the gross weight input adjustment factors, as described with reference to FIG. 4. $\beta_1, \beta_2, \ldots, \beta_m$ correspond to the gross weight input adjustment factors 404, as described with reference to FIG. 4. $x_1, x_2, \ldots, x_m$ correspond to parameters indicated by the flight data 105.

In a particular aspect, the estimated gross weight 555 corresponds to a sum of the intercept term, a first weighted input parameter (e.g., the first adjustment factor*the fuel weight 524), a second weighted input parameter (e.g., the second adjustment factor*an estimated fuel flow 551), a third weighted input parameter (e.g., the third adjustment factor*(the estimated fuel flow 551)$^2$), a fourth weighted input parameter (e.g., the fourth adjustment factor*a high gross weight indicator 553), a fifth weighted input parameter (e.g., the fifth adjustment factor*the pressure ratio 536), a sixth weighted input parameter (e.g., the sixth adjustment factor*(a sum of the static air temperature 530 and the ISA deviation 532)), the seventh weighted input parameter (e.g., the seventh adjustment factor*the AOA 528), the eighth weighted input parameter (e.g., the eighth adjustment factor*(the AOA 528)$^2$), the ninth weighted input parameter (e.g., the ninth adjustment factor*(the AOA 528)$^3$), the tenth weighted input parameter (e.g., the tenth adjustment factor*the stabilizer trim setting 526), the eleventh weighted input parameter (e.g., the eleventh adjustment factor*(the stabilizer trim setting 526)$^2$), the twelfth weighted input parameter (e.g., the twelfth adjustment factor*the Mach number 502), the thirteenth weighted input parameter (e.g., the thirteenth adjustment factor*(the Mach number 502)$^2$), or a combination thereof.

In a particular example, the tail-specific aircraft performance model 181 indicates the estimated fuel flow 551 corresponding to the fuel flow bias 402, the gross weight 564, the Mach number 502, the pressure altitude 506, the ISA deviation 532, or a combination thereof, as described with reference to FIG. 4. For example, the estimated fuel flow 551 corresponds to an adjustment of a first estimated fuel flow based on the fuel flow bias 402 (e.g., the estimated fuel flow 551=(the fuel flow bias 402) (the first estimated fuel flow)), where the first estimated fuel flow is indicated by the nominal aircraft performance model 185 as corresponding to the gross weight 564, the Mach number 502, the pressure altitude 506, the ISA deviation 532, or a combination thereof. In a particular aspect the fuel mileage 582 is based on the fuel flow 522 (e.g., the fuel mileage 582=the true airspeed 538/the fuel flow 522). In a particular aspect, the fuel mileage 582 is based on the estimated fuel flow 551 (e.g., the fuel mileage 582=the true airspeed 538/the estimated fuel flow 551).

The recommendation generator 176 sets the high gross weight indicator 553 to have a first value (e.g., 1) in response to determining that the gross weight 564 fails to satisfy (e.g., is greater than) a gross weight threshold. Alternatively, the recommendation generator 176 sets the high gross weight indicator 553 to have a second value (e.g., 0) in response to determining that the gross weight 564 satisfies (e.g., is less than or equal to) the gross weight threshold. In a particular aspect, the gross weight threshold corresponds to a user input, a configuration setting, default data, or a combination thereof.

In a particular aspect, the recommendation generator 176 determines, based on Equation 45, estimated cost indices 558 associated with a plurality of cruise altitudes 554. For example, the recommendation generator 176 determines an estimated gross weight 544 and an estimated pressure ratio 557 associated with a cruise altitude 574. The recommendation generator 176 uses Equation 45 to determine an estimated cost index 568 associated with the cruise altitude 574, where $CI_{C_{min}}$ corresponds to the estimated cost index 568, $Q_{1C_{min}}$ corresponds to the flight cost 416, GW corresponds to the estimated gross weight 544, and δ corresponds to the estimated pressure ratio 557.

In a particular aspect, the plurality of cruise altitudes 554 correspond to user input, a configuration setting, default data, or a combination thereof. The recommendation generator 176 determines the estimated gross weight 544 based on the gross weight input adjustment factors 404 and a plurality of parameters. To illustrate, the recommendation generator 176 determines the estimated gross weight 544 based on Equation 46, where $GW_{est}$ corresponds to the estimated gross weight 544. $\beta_0$ corresponds to the intercept term indicated by the gross weight input adjustment factors, as described with reference to FIG. 4. $\beta_1, \beta_2, \ldots, \beta_m$ correspond to the gross weight input adjustment factors 404, as described with reference to FIG. 4. $x_1, x_2, \ldots, x_m$ correspond to parameters indicated by the flight data 105, associated with the cruise altitude 574, or both. For example, first parameters that are independent of altitude are indicated by the flight data 105 and second parameters that are dependent on altitude are estimated based on the cruise altitude 574. To illustrate the first parameters include the estimated pressure ratio 557, an estimated ISA deviation 559, or both.

In a particular aspect, the estimated gross weight 544 corresponds to a sum of the intercept term, a first weighted input parameter (e.g., the first adjustment factor*the fuel weight 524), a second weighted input parameter (e.g., the second adjustment factor*the estimated fuel flow 551), a third weighted input parameter (e.g., the third adjustment factor*(the estimated fuel flow 551)$^2$), a fourth weighted input parameter (e.g., the fourth adjustment factor*the high gross weight indicator 553), a fifth weighted input parameter (e.g., the fifth adjustment factor*the estimated pressure ratio 557), a sixth weighted input parameter (e.g., the sixth adjustment factor*(a sum of the static air temperature 530 and the estimated ISA deviation 559)), the seventh weighted input parameter (e.g., the seventh adjustment factor*the AOA 528), the eighth weighted input parameter (e.g., the eighth adjustment factor*(the AOA 528)$^2$), the ninth weighted input parameter (e.g., the ninth adjustment factor*(the AOA 528)$^3$), the tenth weighted input parameter (e.g., the tenth adjustment factor*the stabilizer trim setting 526), the eleventh weighted input parameter (e.g., the eleventh adjustment factor*(the stabilizer trim setting 526)$^2$), the twelfth weighted input parameter (e.g., the twelfth adjustment factor*the Mach number 502), the thirteenth weighted input parameter (e.g., the thirteenth adjustment factor*(the Mach number 502)$^2$), or a combination thereof.

The recommendation generator 176 determines the estimated pressure ratio 557 based on Equation 5, where δ corresponds to the estimated pressure ratio 557, $h_p$ corresponds to the cruise altitude 574, and e corresponds to Euler's number (2.718281828 . . . ). The recommendation generator 176 determines the estimated ISA deviation 559 based on Equation 3, where ΔISA corresponds to the estimated ISA deviation 559, SAT corresponds to the static air temperature 530, and $h_p$ corresponds to the cruise altitude 574.

The recommendation generator 176 selects the recommended cruise altitude 195 from the cruise altitudes 554 based on the estimated cost indices 558. In a particular aspect, the recommendation generator 176, in response to identifying the estimated cost index 568 as the lowest among the estimated cost indices 558, determines that the cruise altitude 574 (associated with the estimated cost index 568) corresponds to a predicted minimum operating cost cruise altitude of the aircraft 108. The recommendation generator 176 selects the cruise altitude 574 as the recommended cruise altitude 195 in response to determining that the cruise altitude 574 corresponds to the predicted minimum operating cost cruise altitude of the aircraft 108.

In a particular aspect, the recommendation generator 176 determines the recommended speed 197 based on the gross weight 564, the pressure ratio 536, the recommended cost index 193, or a combination thereof. For example, the recommendation generator 176 has access to a speed calculator (e.g., an Econ cruise speed table) that maps the recommended cost index 193, the ground speed 520, the true airspeed 538, the gross weight 564, the pressure ratio 536, the temperature ratio 534, or a combination thereof, to the recommended speed 197.

Figure 6:
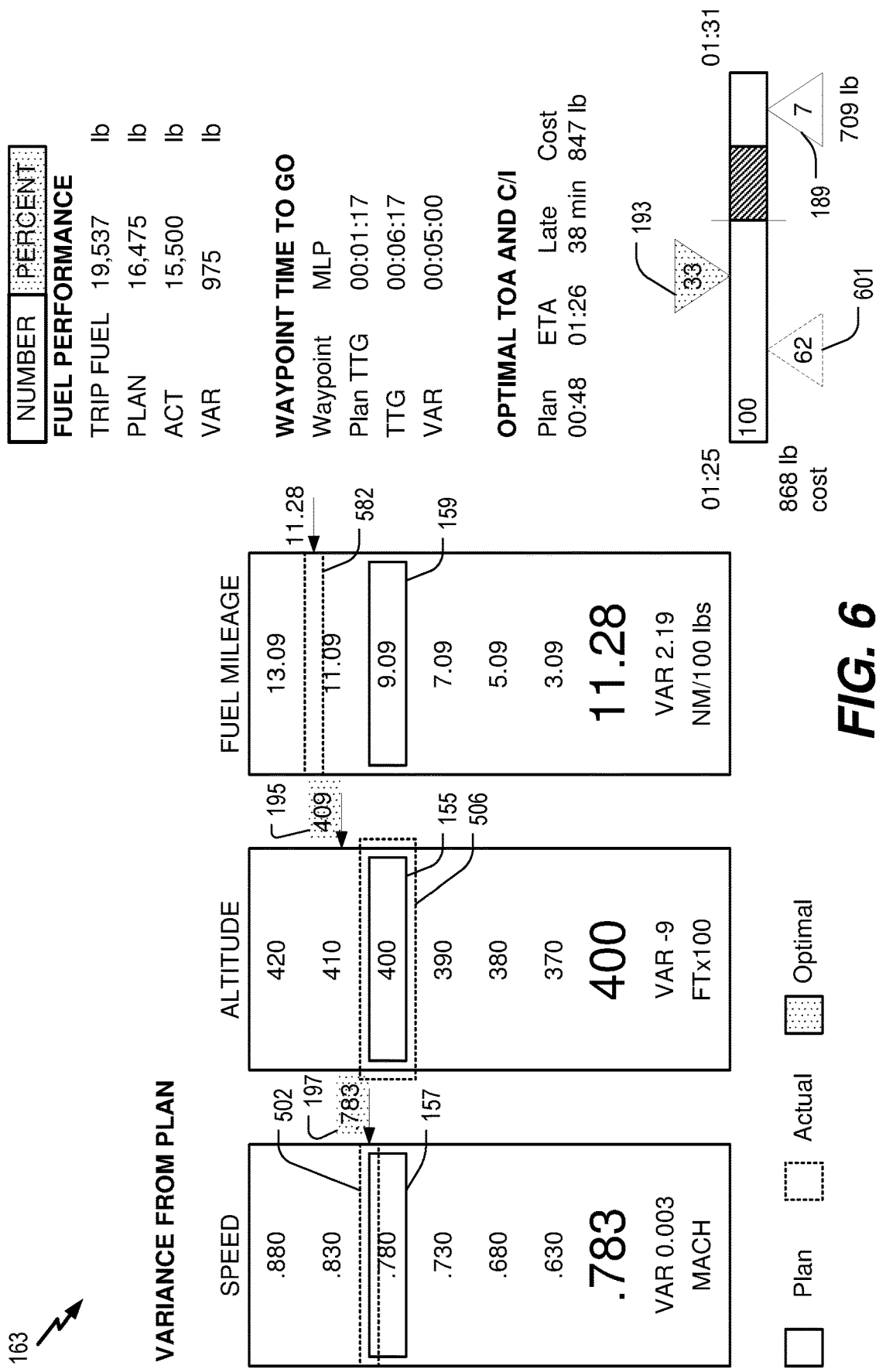
FIG. 6 is a diagram that illustrates aspects of a graphical user interface generated by the system of FIG. 1.

Referring to FIG. 6, an example of aspects of the GUI 163 is shown. In a particular aspect, the GUI 163 is generated by the recommendation generator 176, the on-board computing device 102, the aircraft 108, the system 100 of FIG. 1, or a combination thereof.

In FIG. 6, the GUI 163 indicates the plan speed 157 (e.g., 0.780 Mach), the Mach number 502 (e.g., 0.783 Mach), and the recommended speed 197 (e.g., 0.783 Mach). In a particular aspect, the Mach number 502 represents a current Mach number. For example, the Mach number 502 represents a recently detected Mach number for the aircraft 108. The GUI 163 indicates the plan altitude 155 (e.g., 400), the pressure altitude 506 (e.g., 400), and the recommended cruise altitude 195 (e.g., 409). In a particular aspect, the plan altitude 155 represents a plan flight level, the pressure altitude 506 represents a current flight level, and the recommended cruise altitude 195 represents a recommended flight level. The GUI 163 indicates the plan fuel mileage 159 (e.g., 9.09 nm/100 lbs) and the fuel mileage 582 (e.g., 11.28 nm/100 lbs). In a particular aspect, the fuel mileage 582 represents a current fuel mileage.

The GUI 163 indicates the target cost index 189, the recommended cost index 193, and a detected cost index 601. In a particular aspect, the target cost index 189 represents a current target cost index. For example, the recommendation generator 176 determines the detected cost index 601 based on the following Equation:

$$CI_{detected} = f(M, VGS, VTAS, GW, \delta, \theta)\frac{lb}{100}\bigg/hr \qquad \text{Equation 47}$$

where $CI_{detected}$ corresponds to the detected cost index 601, M corresponds to the Mach number 502 of FIG. 5, VGS corresponds to the ground speed 520, VTAS corresponds to the true airspeed 538, GW corresponds to the gross weight 564 or the estimated gross weight 555, δ corresponds to the pressure ratio 536, θ corresponds to the temperature ratio 534, and f corresponds to a function (e.g., a mapping) of the cost index calculator (e.g., an Econ cruise speed table).

The GUI 163 thus enables display, in real-time, of plan values, actual values, and recommended values for speed, altitude, fuel mileage, cost index, or a combination thereof. In some examples, the GUI 163 enables a user (e.g., a pilot) to make informed decisions during flight regarding operation of the aircraft 108 that take into account changing flight conditions and tail-specific performance. For example, the user, based on comparing the displayed plan values, actual values, and recommended values, provides user input indicating the selected cost index 153, the selected speed 165, the selected altitude 167 of FIG. 1, or a combination thereof. In some examples, the on-board computing device 102 automatically (e.g., independently of user input) sets the selected cost index 153 to the recommended cost index 193, the selected speed 165 to the recommended speed 197, the selected altitude 167 to the recommended cruise altitude 195, or a combination thereof. The on-board computing device 102 (or another component of the aircraft 108) generates, based on the user input, one or more control commands to update an altitude of the aircraft 108 to the selected altitude 167, a speed of the aircraft 108 to the selected speed 165, or a combination thereof, as described with reference to FIG. 1. Operation of the aircraft 108 based on the recommended cost index 193, the recommended speed 197, the recommended cruise altitude 195, or a combination thereof, reduces operating costs of the aircraft 108 relative to the plan values (e.g., the target cost index 189, the plan speed 157, the plan altitude 155, or a combination thereof).

Figure 7:
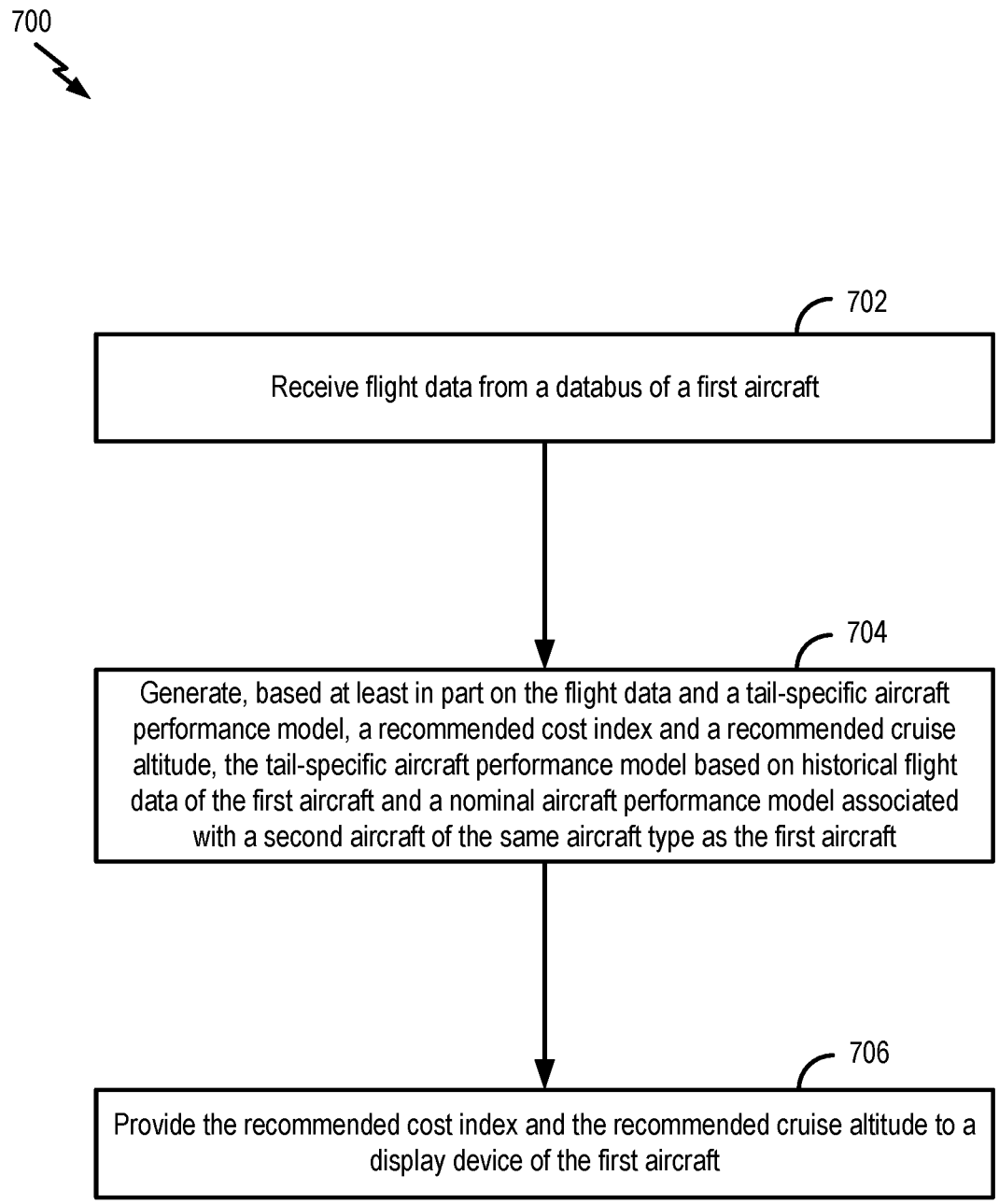
FIG. 7 is a flow chart of an example of a method of tail-specific parameter computation.

FIG. 7 is a flowchart of a method 700 for tail-specific parameter computation. In a particular aspect, the method 700 is performed by the flight data parser 172, the tail-specific parameter generator 174, the recommendation generator 176, the processor 170, the on-board computing device 102, the aircraft 108, the system 100 of FIG. 1, or any combination thereof.

The method 700 includes receiving flight data from a databus of a first aircraft, at 702. For example, the recommendation generator 176 of FIG. 1 receives the flight data 105 from the databus 140 of the aircraft 108, as described with reference to FIG. 1.

The method 700 also includes generating, based on the flight data and a tail-specific aircraft performance model, a recommended cost index and a recommended cruise altitude, at 704. For example, the recommendation generator 176 of FIG. 1 generates, based on the flight data 105 and the tail-specific aircraft performance model 181, the recommended cost index 193 and the recommended cruise altitude 195, as described with reference to FIGS. 1 and 5. The tail-specific aircraft performance model 181 is based on the historical flight data 107 of the aircraft 108 and the nominal aircraft performance model 185. The nominal aircraft performance model 185 is associated with a second aircraft (e.g., a representative aircraft) of the same aircraft type (e.g., the aircraft type 187) as the aircraft 108, as described with reference to FIG. 1.

The method 700 further includes providing the recommended cost index and the recommended cruise altitude to a display device of the first aircraft, at 706. For example, the recommendation generator 176 of FIG. 1 provides the recommended cost index 193 and the recommended cruise altitude 195 to the display device 144 of the aircraft 108. To illustrate, the recommendation generator 176 generates the GUI 163 indicating the recommended cost index 193, the recommended cruise altitude 195, or both. The recommendation generator 176 provides the GUI 163 to the display device 144.

The method 700 thus enables use of the tail-specific parameters 141 (e.g., the tail-specific aircraft performance model 181 that is based on the tail-specific parameters 141) to determine the recommended cost index 193. In some examples, the recommended cost index 193, the recommended cruise altitude 195, or both reduce (e.g., minimize) operational costs of the aircraft 108 during flight.

Figure 8:
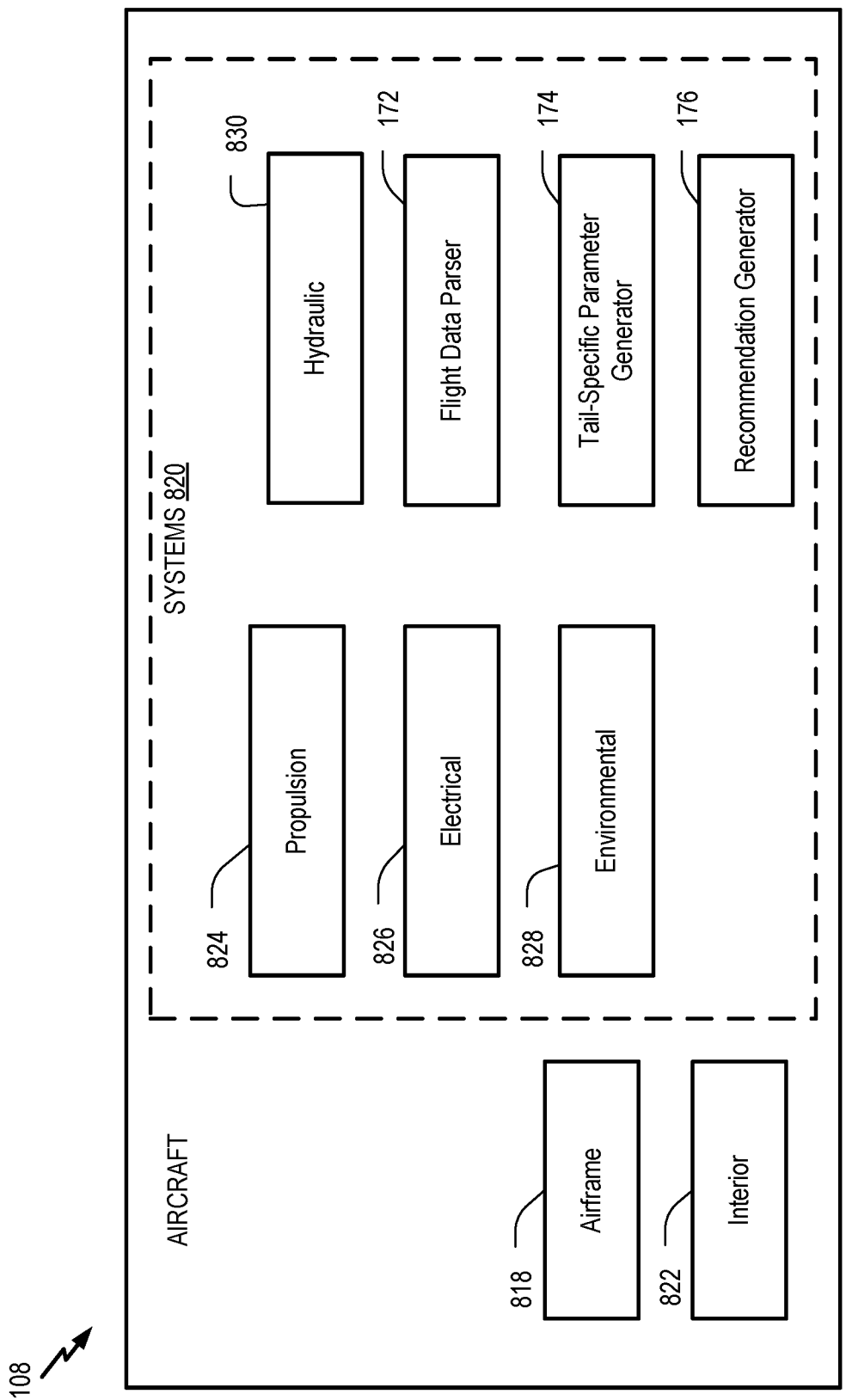
FIG. 8 is a block diagram of an aircraft configured to support aspects of computer-implemented methods and computer-executable program instructions (or code) according to the present disclosure.

Aspects of the disclosure may be described in the context of the aircraft 108 as shown in FIG. 8. The aircraft 108 includes an airframe 818 with a plurality of systems 820 (e.g., high-level systems) and an interior 822. Examples of the systems 820 include one or more of a propulsion system 824, an electrical system 826, an environmental system 828, a hydraulic system 830, the flight data parser 172, the tail-specific parameter generator 174, and the recommendation generator 176. Other systems can also be included.

The flight data parser 172, the tail-specific parameter generator 174, the recommendation generator 176, or a combination thereof, are configured to support aspects of computer-implemented methods and computer-executable program instructions (or code) according to the present disclosure. For example, the flight data parser 172, the tail-specific parameter generator 174, the recommendation generator 176, or portions thereof, are configured to execute instructions to initiate, perform, or control one or more operations described with reference to FIGS. 1-7.

Although one or more of FIGS. 1-8 illustrate systems, apparatuses, and/or methods according to the teachings of the disclosure, the disclosure is not limited to these illustrated systems, apparatuses, and/or methods. One or more functions or components of any of FIGS. 1-8 as illustrated or described herein may be combined with one or more other portions of another of FIGS. 1-8. For example, one or more elements of the method 700 of FIG. 7 may be performed in combination with other operations described herein. Accordingly, no single implementation described herein should be construed as limiting and implementations of the disclosure may be suitably combined without departing form the teachings of the disclosure. As an example, one or more operations described with reference to FIGS. 1-7 may be optional, may be performed at least partially concurrently, and/or may be performed in a different order than shown or described.

Examples described above are illustrative and do not limit the disclosure. It is to be understood that numerous modifications and variations are possible in accordance with the principles of the present disclosure.

The illustrations of the examples described herein are intended to provide a general understanding of the structure of the various implementations. The illustrations are not intended to serve as a complete description of all of the elements and features of apparatus and systems that utilize the structures or methods described herein. Many other implementations may be apparent to those of skill in the art upon reviewing the disclosure. Other implementations may be utilized and derived from the disclosure, such that structural and logical substitutions and changes may be made without departing from the scope of the disclosure. For example, method operations may be performed in a different order than shown in the figures or one or more method operations may be omitted. Accordingly, the disclosure and the figures are to be regarded as illustrative rather than restrictive.

Moreover, although specific examples have been illustrated and described herein, it should be appreciated that any subsequent arrangement designed to achieve the same or similar results may be substituted for the specific implementations shown. This disclosure is intended to cover any and all subsequent adaptations or variations of various implementations. Combinations of the above implementations, and other implementations not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single implementation for the purpose of streamlining the disclosure. Examples described above illustrate but do not limit the disclosure. It should also be understood that numerous modifications and variations are possible in accordance with the principles of the present disclosure. As the following claims reflect, the claimed subject matter may be directed to less than all of the features of any of the disclosed examples. Accordingly, the scope of the disclosure is defined by the following claims and their equivalents.

What is claimed is:

1. A device comprising:
 a processor configured to:
  receive flight data during a flight of a first aircraft;
  generate, based at least in part on the flight data and a tail-specific aircraft performance model for the first aircraft, a recommended cost index and a recommended cruise altitude, wherein the recommended cost index balances time-related costs and fuel-related costs associated with a planned flight of the first aircraft, and wherein the recommended cost index is adapted to reduce a combined cost metric reflecting both time and fuel expense;
  provide the recommended cost index and the recommended cruise altitude for the flight to a display device;
  receive a user input indicating a selected cost index; and
  generate, based on the selected cost index, a control command to update an altitude, a speed, or both, of the first aircraft.

2. The device of claim 1, wherein the tail-specific aircraft performance model is based at least in part on historical flight data of the first aircraft.

3. The device of claim 1, wherein the tail-specific aircraft performance model is based at least in part on a nominal aircraft performance model associated with a second aircraft of the same aircraft type as the first aircraft.

4. The device of claim 1, wherein the flight data is received during the flight via a network interface from a databus of the first aircraft.

5. The device of claim 1, wherein the processor is further configured to determine an implicit cost index of a flight, wherein the recommended cost index is based on the implicit cost index, and wherein the implicit cost index is based on a reported gross weight of the first aircraft during the flight, a detected Mach number of the first aircraft during the flight, a detected ground speed of the first aircraft during the flight, a detected airspeed of the first aircraft during the flight, a detected pressure altitude of the first aircraft during the flight, a detected air temperature outside the first aircraft during the flight, or a combination thereof.

6. The device of claim 1, wherein the processor is further configured to determine an estimated gross weight of the first aircraft during a flight, the estimated gross weight based on a fuel weight of the first aircraft during the flight, a reference fuel weight, an estimated fuel flow during the flight, a high gross weight indicator for the flight, a detected pressure altitude of the first aircraft during the flight, a detected air temperature outside the first aircraft during the flight, a detected Mach number of the first aircraft during the flight, a detected angle of attack of the first aircraft during the flight, a detected stabilizer trim setting of the first aircraft during the flight, or a combination thereof, wherein the recommended cost index is based on the estimated gross weight.

7. The device of claim 6, wherein the processor is further configured to determine the recommended cost index based on an estimated minimum operating cost of the first aircraft during the flight, the estimated gross weight, the detected pressure altitude, or a combination thereof.

8. The device of claim 1, wherein the recommended cruise altitude corresponds to a predicted minimum operating cost cruise altitude of the first aircraft, wherein the recommended cruise altitude is based on estimated cost indices associated with a plurality of cruising altitudes, wherein an estimated cost index of the estimated cost indices is associated with the predicted minimum operating cost cruise altitude, and wherein the estimated cost index is based on an estimated gross weight of the first aircraft during a flight.

9. The device of claim 1, wherein the processor is integrated into the first aircraft.

10. The device of claim 1, wherein the processor is integrated into a portable Electronic Flight Bag (EFB) computer.

11. The device of claim 1, wherein the processor is further configured to generate the tail-specific aircraft performance model by modifying a nominal aircraft performance model based on historical flight data of the first aircraft, wherein the nominal aircraft performance model is associated with a second aircraft of the same aircraft type as the first aircraft.

12. The device of claim 11, wherein the nominal aircraft performance model is based on second flight data of the second aircraft, and wherein the processor is configured to determine whether to modify the nominal aircraft performance model based on the historical flight data of the first aircraft based on determining whether the historical flight data satisfies a filter criterion.

13. The device of claim 12, wherein the processor is further configured, prior to determining whether the historical flight data satisfies the filter criterion, sort the historical flight data based on a difference between a pressure altitude of the first aircraft and a target pressure altitude, and wherein the historical flight data indicates the pressure altitude of the first aircraft.

14. The device of claim 12, wherein the processor is further configured to determine whether the historical flight data satisfies the filter criterion based on a comparison of an angle of attack change threshold and a difference between a first angle of attack associated with the first aircraft and a second angle of attack associated with the first aircraft, wherein the historical flight data indicates the first angle of attack and the second angle of attack, wherein the first angle of attack is associated with a first data collection time, and wherein the second angle of attack is associated with a second data collection time.

15. The device of claim 12, wherein the processor is further configured to:
determine an average fuel mileage based on the historical flight data; and
determine whether the historical flight data satisfies the filter criterion based on a comparison of a fuel mileage indicated by the historical flight data and a fuel mileage threshold, wherein the fuel mileage threshold is based on the average fuel mileage.

16. A method comprising:
receiving, by a device, flight data during a flight of a first aircraft;
generating, based at least in part on the flight data and a tail-specific aircraft performance model for the first aircraft, a recommended cost index and a recommended cruise altitude, wherein the recommended cost index balances time-related costs and fuel-related costs associated with a planned flight of the first aircraft, and wherein the recommended cost index is adapted to reduce a combined cost metric reflecting both time and fuel expense;
providing the recommended cost index and the recommended cruise altitude for the flight from the device to a display device of the first aircraft;
receiving a user input indicating a selected cost index; and
generating, based on the selected cost index, a control command to update an altitude, a speed, or both, of the first aircraft.

17. The method of claim 16, further comprising updating the tail-specific aircraft performance model based on the flight data.

18. A non-transitory computer-readable medium storing instructions that, when executed by a processor, cause the processor to:
receive flight data during a flight of a first aircraft;
generate, based at least in part on the flight data and a tail-specific aircraft performance model for the first aircraft, a recommended cost index and a recommended cruise altitude, wherein the recommended cost index balances time-related costs and fuel-related costs associated with a planned flight of the first aircraft, and wherein the recommended cost index is adapted to reduce a combined cost metric reflecting both time and fuel expense;
provide the recommended cost index and the recommended cruise altitude for the flight to a display device of the first aircraft;
receive a user input indicating a selected cost index; and
generate, based on the selected cost index, a control command to update an altitude, a speed, or both, of the first aircraft.

19. The non-transitory computer-readable medium of claim 18, wherein the instructions, when executed by the processor, also cause the processor to, in response to determining that the flight data satisfies a filter criterion, update tail-specific aircraft performance model based on the flight data.

20. The method of claim 16, further comprising generating the tail-specific aircraft performance model by modifying a nominal aircraft performance model based on historical flight data of the first aircraft, wherein the nominal aircraft performance model is associated with a second aircraft of the same aircraft type as the first aircraft.

* * * * *